(12) United States Patent
Stalley

(10) Patent No.: US 11,593,280 B2
(45) Date of Patent: Feb. 28, 2023

(54) PREDICTIVE PACKET HEADER COMPRESSION

(71) Applicant: Intel Corporation, Santa Clara, CA (US)

(72) Inventor: Sean O. Stalley, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 333 days.

(21) Appl. No.: 16/564,834

(22) Filed: Sep. 9, 2019

(65) Prior Publication Data

US 2019/0391936 A1    Dec. 26, 2019

Related U.S. Application Data

(60) Provisional application No. 62/866,396, filed on Jun. 25, 2019.

(51) Int. Cl.
    *G06F 13/14*      (2006.01)
    *G06N 5/04*       (2006.01)
    *G06F 13/42*      (2006.01)

(52) U.S. Cl.
    CPC .............. *G06F 13/14* (2013.01); *G06F 13/42* (2013.01); *G06N 5/04* (2013.01); *G06F 2213/40* (2013.01)

(58) Field of Classification Search
    CPC .................................................. G06F 16/9577
    See application file for complete search history.

(56) References Cited

U.S. PATENT DOCUMENTS

| 6,999,429 | B1* | 2/2006 | Hannu | H04L 69/04 |
| | | | | 370/328 |
| 7,602,778 | B2* | 10/2009 | Guichard | H04L 45/50 |
| | | | | 370/389 |
| 9,448,957 | B2* | 9/2016 | Maitra | G06F 13/4027 |
| 2007/0147426 | A1 | 6/2007 | Sharma et al. | |
| 2010/0329255 | A1 | 12/2010 | Singhal et al. | |
| 2012/0017026 | A1 | 1/2012 | Luk et al. | |

OTHER PUBLICATIONS

Jacobson, V., "Compressing TCP/IP Headers for Low-Speed Serial Links", Network Working Group Request for Comments: 1144, accessed at: https://tools.ietf.org/pdf/rfc144.pdf, Feb. 1990, 45 pages.
EPO; Extended European Search Report issued in Patent Application No. EP 20165142.9, dated Aug. 21, 2020; 13 pages.

\* cited by examiner

*Primary Examiner* — Henry Tsai
*Assistant Examiner* — Juanito C Borromeo
(74) *Attorney, Agent, or Firm* — Alliance IP, LLC

(57) ABSTRACT

Packets may be compressed based on predictive analyses. For example, in one embodiment, it is determined that an explicit value for a particular header field can be inferred by the receiver agent, a packet header is constructed that either omits the header field or includes a differential value for the header field in lieu of the explicit value for the header field. The packet header may be decompressed upon receipt by deriving the explicit value for the particular header field.

19 Claims, 20 Drawing Sheets

PREDICTIVE PACKET HEADER COMPRESSION

CROSS REFERENCE TO RELATED APPLICATIONS

This application claims the benefit of and priority from U.S. Provisional Patent Application No. 62/866,396 entitled "Predictive Packet Header Compression" and filed Jun. 25, 2019, the entire disclosure of which is incorporated herein by reference.

FIELD

This disclosure pertains to computing systems, and in particular (but not exclusively) to predictive header compression for packets.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. Servers may also be implemented using distributed computing, in rack scale architectures, and other alternative implementations. As the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
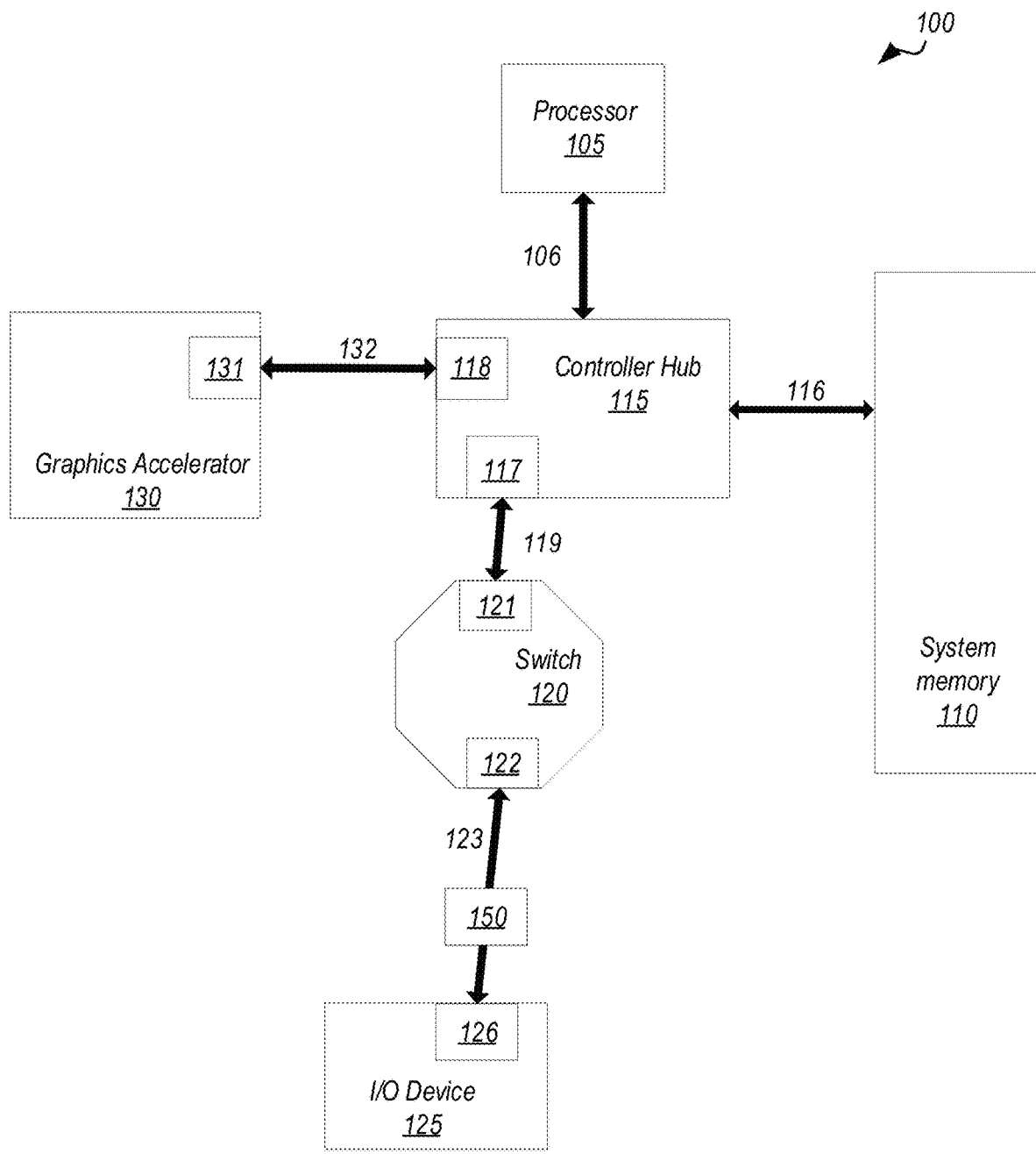
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, Cloud, Fog, Enterprise, etc.), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
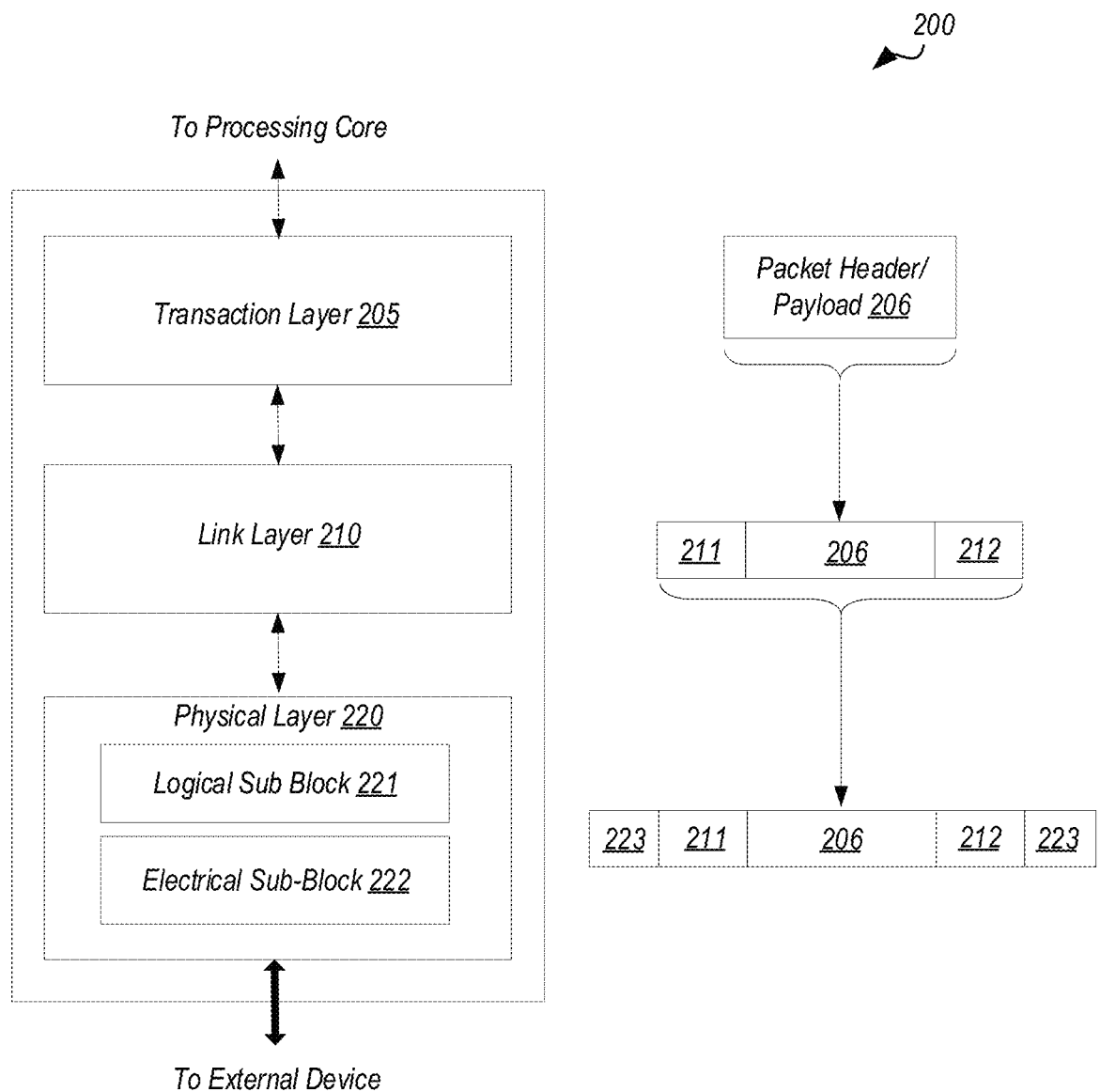
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
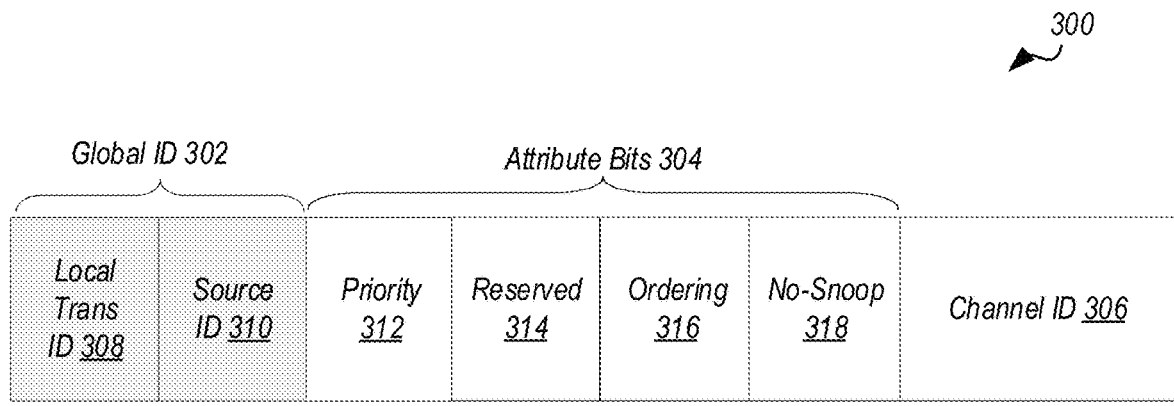
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
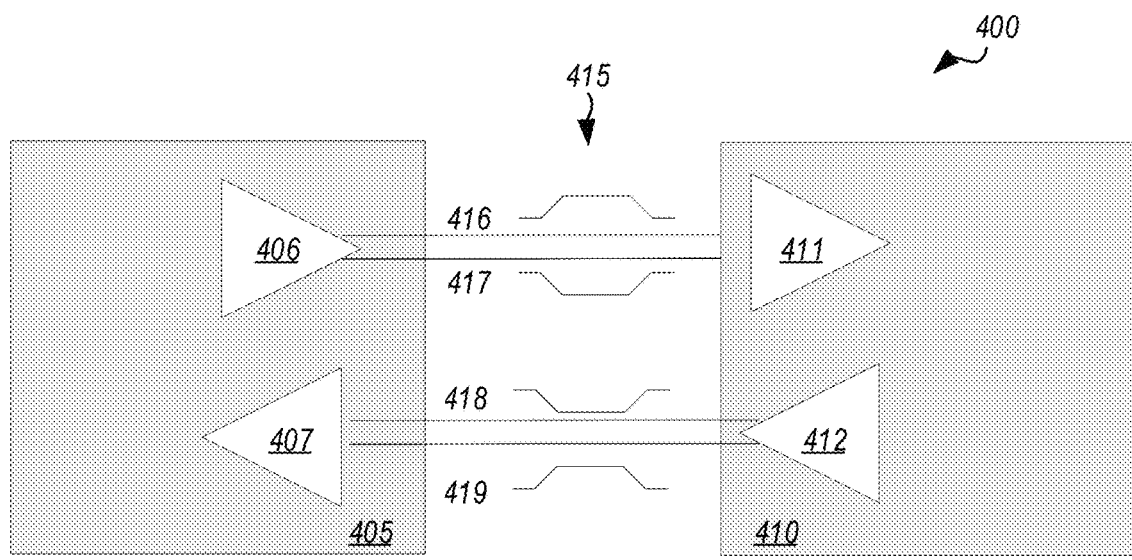
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

In some instances, it may be beneficial to compress packets (e.g., TLPs) sent between agents on a communication link. However, current solutions for compressing packets were designed to compress packet headers with fairly large fields (32+ bits per field) and do not provide an efficient way to compress shorter fields (e.g., 1-16 bits, such as those found in PCIe TLPs). They may also be less efficient at compressing fields that change from packet to packet in a predictable way. In addition, existing techniques may provide protocol-level compression and bandwidth reduction, but not link-level compression/bandwidth reduction.

Thus, aspects of the present disclosure provide packet compression techniques that can be used to efficiently compress packet headers (e.g., for PCIe TLP packets, or other types of data packets for other protocols), reducing the amount of data sent in each packet header. The present techniques may improve on existing packet header compression mechanisms or techniques by providing an efficient method to compress shorter header fields, as well as by providing a more efficient method to compress fields that change in predictable ways from packet to packet.

As an example, in some embodiments, differential values may be used in lieu of explicit values for header fields. For instance, a receiver agent may store headers of previously sent packets, and a transmitter agent may send differential values indicating the difference between the previous packet and the current one. The receiver can then combine the differential values with the stored values to decompress the header and determine the values of its fields. As another example, in some embodiments, packet headers may be compressed by removing/omitting fields that have the same value across multiple headers in a connection/sequence. In addition, in some embodiments, packet headers may be compressed by removing/omitting fields from the packet that change in a predictable way across multiple headers in a connection or sequence.

The techniques disclosed herein may reduce overhead and improve throughput of a system bus, such as by shortening the size of packet headers. Reduced overhead means more data throughput (i.e., "goodput"), potentially lower latency, and improved energy efficiency (e.g., in terms of pJ/bit) over the bus. The techniques may be applied, for example, to PCIe TLPs to reduce the number of bits transmitted in a PCIe Memory Transaction Header or Completion Header, since such headers may include fields that are generally predictable (e.g., generally Lengths are power-of-two and Byte Enables stay constant, while Address fields and Byte Enable may change in a predictable way). In addition, the techniques described herein may be applied to compress other types of packets as well, such as, for example, Universal Serial Bus (USB)-based packets for USB-based protocols, Compute Express Link (CXL) packets for CXL-based protocols, Cache Coherent Interconnect for Accelerators (CCIX) packets for CCIX-based protocols, or Transmission Control Protocol/Internet Protocol (TCP/IP) packets for TCP/IP-based protocols.

Figure 5:
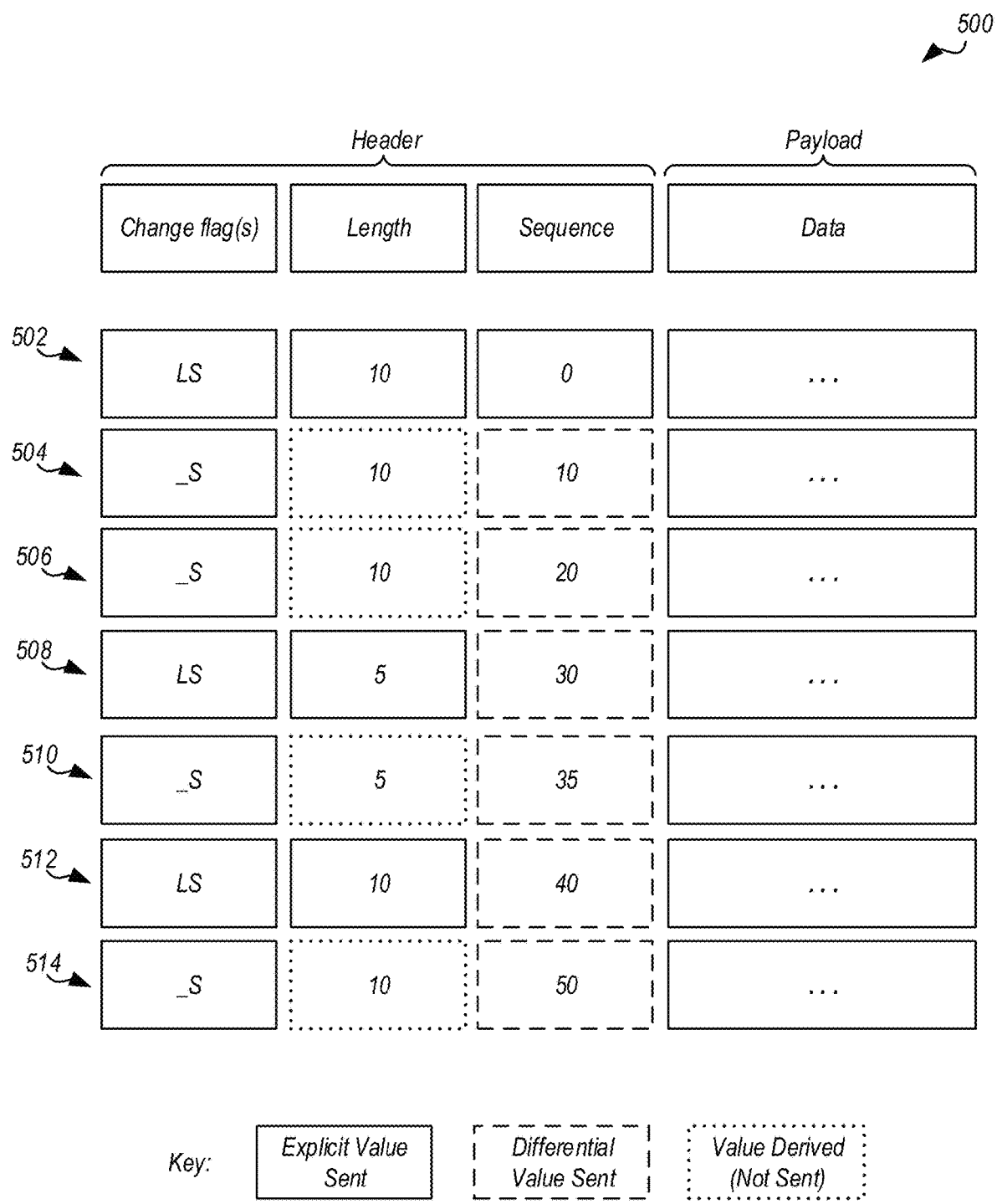
FIG. 5 is a diagram illustrating an example packet compression technique.

Turning to the diagram 500 of FIG. 5, an example packet compression technique is shown. In particular, FIG. 5 shows an example sequence of packets (502-514) and their respective data fields, and shows various packet header fields that may be omitted or reduced in size in some instances. The example packets shown in FIG. 5 each include a header containing a Length and Sequence field. A value of the Length field may indicate a length of the packet (e.g., in bits or bytes), while a value of the Sequence field may indicate a relative position of the packet within a sequence of packets. The value of the Sequence field may be based on the value of the Length field in some cases. In the example shown, the value of the Sequence field for the packets 502-514 indicates a position of the starting bit in the sequence of the packets. It will be understood that the values for the Length and Sequence fields shown in FIG. 5 represent explicit values for those fields, and may not be the values that are actually included in the packets. Rather, as described below, values for the Length and Sequence fields may be omitted or may be sent as differential values rather than the explicit values shown. It will also be understood that the packets may include additional or fewer header fields than those shown, and that the concepts described below may be applied to other types of header fields where applicable or appropriate.

When sending a sequence of multiple packets whose length is constant, the Length field may only need to be present in the first packet of the sequence. Based on the value included in the Length field of the first packet, a receiver agent can implicitly derive the length value in subsequent packets. Thus, the explicit value for the Length field does not need to be sent by a sender agent in subsequent packets of the sequence. For instance, referring to the example shown in FIG. 5, the packet 502 initially includes the value "10" in the Length field. Since the length value for packets 504, 506 is also "10", the length value need not be included in those packets so the sender may omit the Length field from the packet entirely. By detecting that the Length field is omitted from the packets 504, 506, the receiver agent may conclude that the length value for the packet has not changed from the length value of the previous packet (which may have been cached by the receiver agent upon receiving the packet 502), and the receiver agent may accordingly process the packets 504, 506 using a length value of "10" as in packet 502.

When the length value changes to "5" for packet 508, the sender agent may include the Length field (indicating the length value of 5) in the packet that is transmitted to the receiver agent as shown. Since the length value for packet 510 is also "5", the length value need not be included in packet 510 and the sender may again omit the Length field from the packet 510. The receiver agent may conclude, upon receipt of the packet 510, that the length value for the packet 510 has not changed from the previous value in packet 508 (which may have been cached by the receiver agent upon receiving the packet 508), and the receiver agent may accordingly process the packet 510 using a length value of "5" as in packet 508.

When the length value changes back to "10" for packet 512, the sender agent may include the Length field (indicating the length value of 10) in the packet that is transmitted to the receiver agent as shown. Since the length value for packet 512 is also "10", the length value need not be included in packet 512 and the sender may again omit the Length field. The receiver agent may conclude, upon receipt of packet 512, that the length value for the packet 512 has not changed from the previous value in packet 510 (which may have been cached by the receiver agent upon receiving the packet 510), and the receiver agent may accordingly process the packet 512 using a length value of "10" as in packet 510.

In contrast to the length values discussed above, a sequence value may always change in subsequent packets of the sequence. To reduce the number of bits that need to be transmitted in each packet, a shorter differential value may be sent by the sender agent to the receiver agent in lieu of a full explicit sequence value. The differential value may indicate the difference between the sequence number of the previous packet and the sequence number of the current one. For instance, referring to the example shown in FIG. 5, the packet 502 initially includes a value of "0" in the Sequence field. In this example, because the length value for the packet 502 is 10, the sequence value for the next packet 504 will be 10. Since the receiver agent may derive the sequence value for the packet 504 based on the sequence value of the previous packet 502 (based on the length value and the sequence value of the packet 502), the sender agent may be able to send a differential value indicating a differential of 10 from the previous sequence value in lieu of sending the explicit value of 10. Though these values are the same in this example, in many instances, the differential value may be much smaller than the explicit sequence value, and thus, sending the differential value may reduce the size of the Sequence field in the header of the packet 504. For instance, because the length value for the packet 504 is 10, the sequence value for the next packet 506 will be 20 (based on the length and sequence values of the previous packet 504). Thus, the sender agent may be able to send a differential value indicating a differential of 10 from the previous sequence value in lieu of sending the explicit sequence value of 20, which may reduce the size of the Sequence field in the header of the packet 506 (e.g., an additional bit is required to represent "20" versus "10" in binary). Using the same techniques, differential values may also be sent for the respective Sequence fields in packets 508, 510, 512, 514 in lieu of the explicit sequence values for the fields. It will be noted from the example shown in FIG. 5 that, in many cases, after a first packet in a sequence is sent, the sequence number may thereafter be sent as a differential value. Further, for most packets in the example sequence, the length field can be omitted entirely.

In some embodiments, such as in the example shown, the packet headers may also include change flags that indicate whether a change has occurred in one or more other header fields. For instance, in the example shown, a change flag "L" is used to indicate a new length value for the Length field of the packet (compared with the previous packet), and a change flag "S" is used to indicate a new sequence value for the Sequence field of the packet (compared with the previous packet). A receiver agent may determine, based on these change flags, that a value change has occurred and may process the packet accordingly. For example, the receiver agent may cache a length value included in a packet that includes a "L" change flag, since such a flag would indicate a different length value for the current packet than for the prior packet.

Figure 6A:
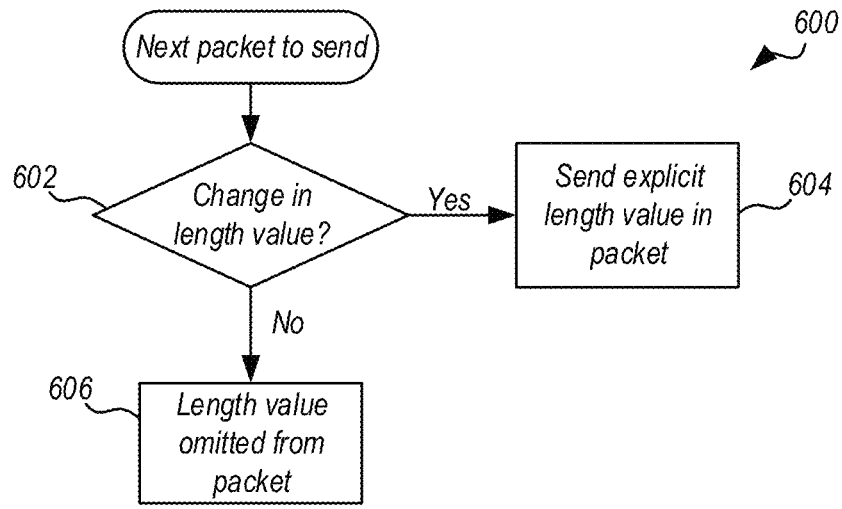
FIGS. 6A-6D are flow diagrams illustrating example processes for the packet compression technique shown in FIG. 5.
Figure 6B:
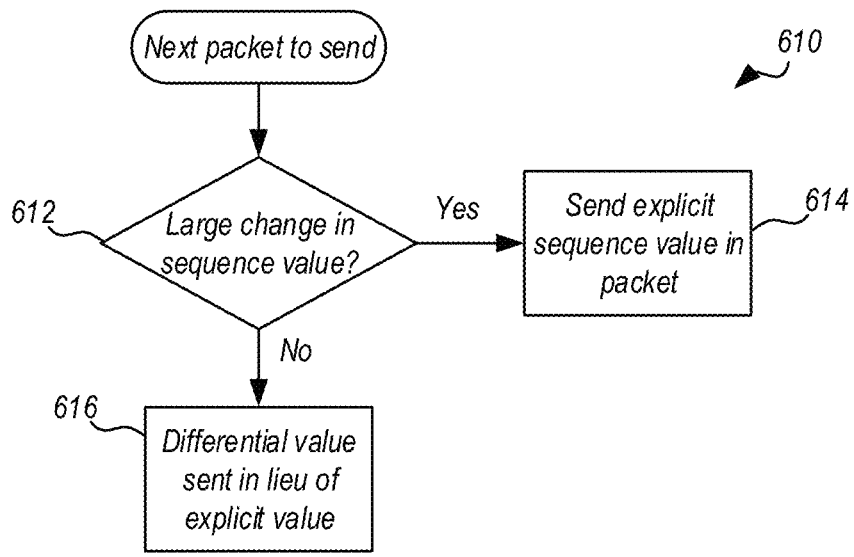
Figure 6C:
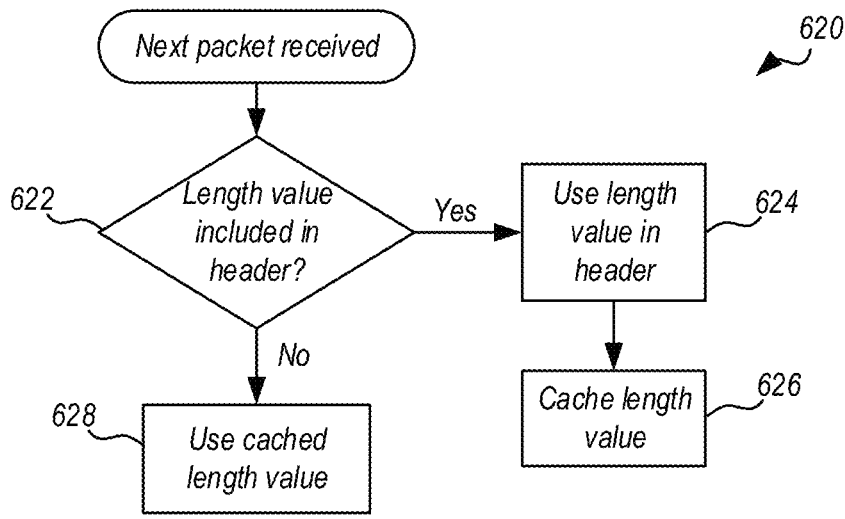
Figure 6D:
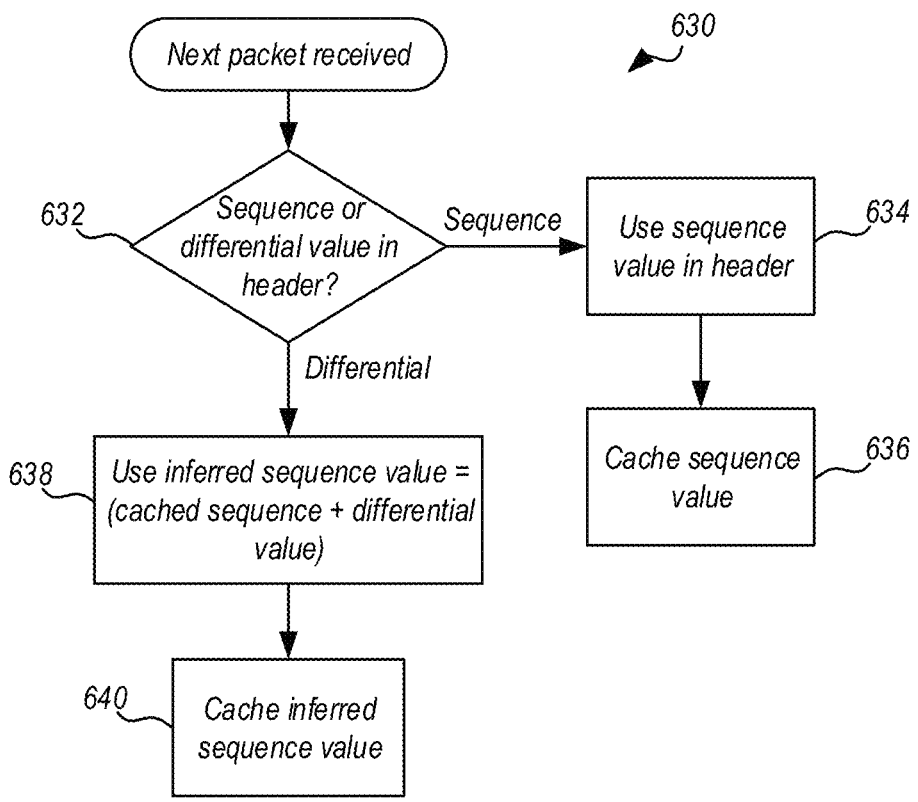

FIGS. 6A-6D are flow diagrams illustrating example processes for the packet compression technique shown in FIG. 5 and described above. The example processes shown in FIGS. 6A-6B may be performed by a sender agent, or one or more components thereof, before sending a packet to a receiver agent. FIG. 6A shows a process 600 of determining whether to include an explicit length value in the Length field of a packet, and FIG. 6B shows a process 610 of determining whether to include an explicit sequence value or a differential value in the Sequence field of a packet. The processes shown in FIGS. 6C-6D may be performed by a receiver agent, or one or more components thereof, after receipt of a packet from a sender agent. FIG. 6C shows a process 620 of determining a length value for a received packet, and FIG. 6D shows a process 630 of determining a sequence value for a received packet. The processes shown may include fewer or additional operations than those shown.

In the example process 600 of FIG. 6A, a sender agent begins processing a next packet of a sequence to send to the receiver agent, and determines at 602 whether there is a change in the length value from the previous packet sent. If there is a change in the length value, then the sender agent includes the explicit length value for the packet in the Length field of the packet at 604. If there is no change in the length value from the previous packet, then the sender agent omits the explicit length value from the packet at 606. This may include omitting the Length field of the packet entirely, or including a value in the Length field indicating no change (e.g., 0).

In the example process 610 of FIG. 6B, a sender agent begins processing a next packet of a sequence to send to the receiver agent, and determines at 612 whether there is a large change in the sequence value for the packet compared with the previously sent packet. A large change in the sequence value may refer to a change greater than a particular threshold value. For instance, in some cases, differential values may be able to handle relatively small sequence number changes (e.g., up to 255), but changes greater than that may require that the explicit value be sent in the packet. Thus, if it is determined that a change in the sequence value is large enough (e.g., the differential is above a threshold value), then the sender agent includes the explicit sequence value in the Sequence field of the packet at 614. On the other hand, if the change in the sequence value is determined to be relatively small (e.g., the differential is below a threshold value), then the sender agent sends a differential value in lieu of the explicit sequence value in the Sequence field of the packet at 616.

In the example process 620 of FIG. 6C, a receiver agent receives a next packet of a sequence from a sender agent, and determines at 622 whether a length value was included in the packet (e.g., in a Length field of a header of the packet). If a length value was included in the packet, then the receiver agent, at 624, uses the length value included in the packet in its processing of the packet and caches the received length value at 626. If a length value was not included in the packet, then the receiver agent, at 628, uses a previously cached length value in its processing of the packet.

In the example process 630 of FIG. 6D, a receiver agent receives a next packet of a sequence from a sender agent, and determines at 632 whether an explicit sequence value was included in the packet (e.g., in a Sequence field of a header of the packet) or a differential value was included instead. If an explicit sequence value was included in the packet, then at 634, the receiver agent uses the sequence value included in the packet in its processing of the packet, and caches the sequence value for later use at 636 (e.g., if a differential value is later sent in a next packet). If a differential value was included in the packet, then at 638, the receiver agent determines an inferred sequence value for the packet by adding the differential value to a cached sequence value, and uses the inferred sequence value in its processing of the packet. The receiver agent then caches the inferred sequence value for later use at 640 (e.g., if another differential value is sent in a next packet).

The concepts of FIGS. 5, 6A-6D may be expanded upon as well, allowing certain fields (like the Sequence field) to be omitted entirely. For instance, because there may be a predictable relationship between the length value and the sequence value for packets, the relationship can be used by the receiver agent to implicitly track the sequence number without it (or a differential value) needing to be transmitted over the link, further reducing the size of the packet.

Figure 7:
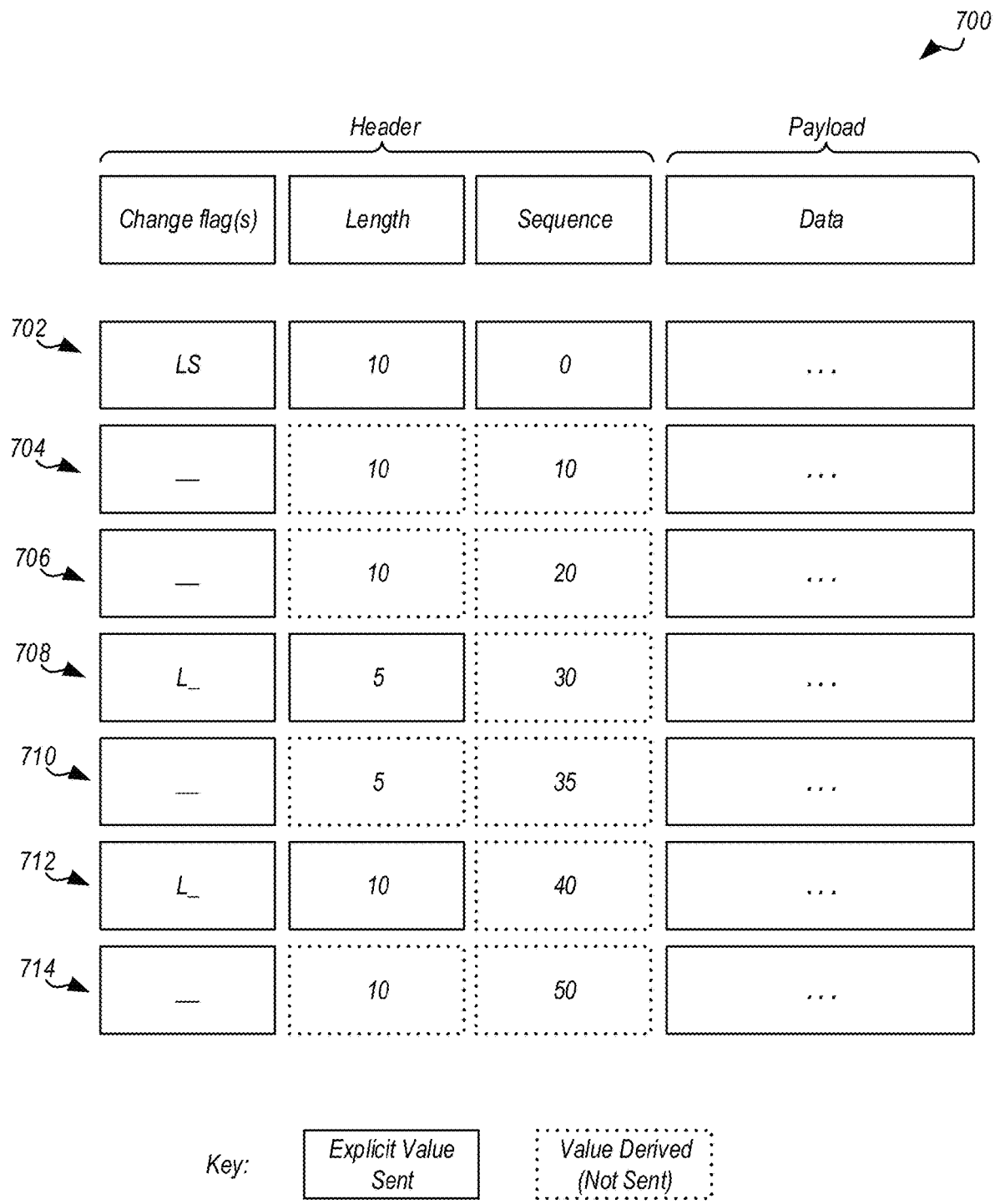
FIG. 7 is a diagram illustrating another example packet compression technique.

Turning to the diagram 700 of FIG. 7, another example packet compression technique is shown. In particular, FIG. 7 shows an example sequence of packets (702-714), and highlights various fields that may be omitted in some instances. The example packets shown in FIG. 7 include a header containing a Length and Sequence field, which may each represent the same information as described above with respect to the Length and Sequence fields described above with respect to FIG. 5. In the example shown in FIG. 7, the explicit value for the Length field may be omitted using the same technique as described above with respect to FIG. 5. However, instead of sending differential values in subsequent packets that indicate the sequence value changes from packet to packet as in FIG. 5, the sequence values (and thus, the Sequence field) may be omitted entirely using the techniques described below.

For instance, in the example shown, the packet 702 initially includes a sequence value of "0" in the Sequence field. Because the length value for the packet 702 is 10, the sequence value for the next packet 704 will be 10. Since the receiver agent may derive this value for packet 704 based on the length and sequence values of the previous packet 702 (i.e., the sequence value of "10" for packet 704 is based on the addition of the length value (10) of packet 702 to the sequence value (0) of packet 702), the sender agent may omit the sequence value entirely from the packet 704, reducing the size of the header of the packet 704. Moreover, the receiver agent may derive the sequence value for packet 706 based on the length and sequence values of the previous packet 704, even though those values are not included in the packet 704. This is because the receiver agent may have previously cached the length value sent with packet 702 and the sequence value for packet 704 (which was derived from the sequence value included in packet 702 as described above, and may have also been cached). The receiver agent may thus determine that the sequence value for packet 706 is "20" based on the addition of the cached length value (10) for packet 702 (since it did not change for packet 704) and the cached sequence value (10) for packet 704 (which was derived from as described above). Similarly, the receiver agent may derive the sequence values for each of packets 708, 710, 712 based on the length and sequence values of previously sent packets, and as such, the sequence values may be omitted from those packets as well. It will be noted from the example shown in FIG. 7 that, in many cases, after a first packet in a sequence is sent, the sequence number may thereafter be omitted. Further, for most packets in the example shown, the length field could be omitted as well.

In some embodiments, such as in the example shown, change flags may be included in the header to indicate whether a change has occurred in one or more header fields. For instance, in the example shown, a change flag "L" indicates a new length value for the Length field of the packet, and a change flag "S" indicates a sequence value for the Sequence field that cannot be inferred from previous packets. A receiver agent may determine, based on these change flags, that a value change has occurred and may process the packet accordingly. For example, upon detection of an "S" change flag, the receiver agent may use the sequence value included in the packet to process the packet rather than determining an inferred sequence value for the packet.

Figure 8A:
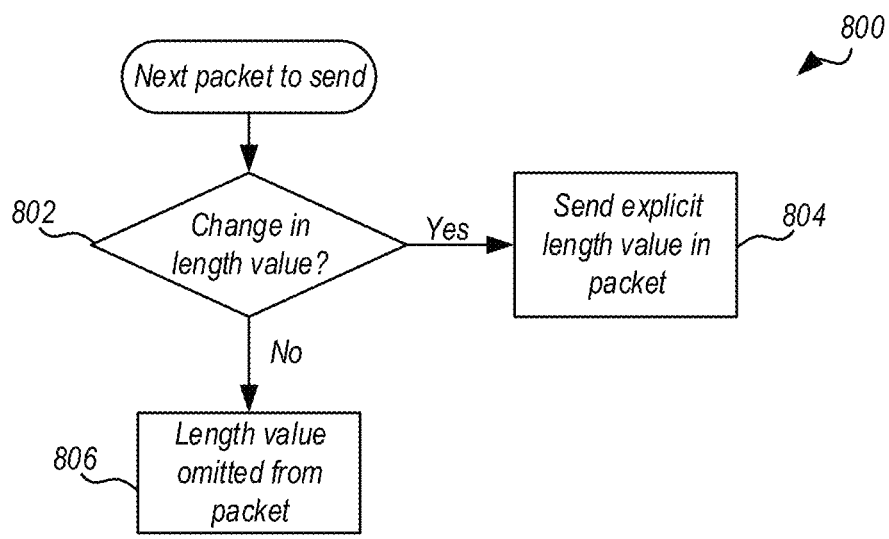
FIGS. 8A-8D are flow diagrams illustrating example processes for the packet compression technique shown in FIG. 7.
Figure 8B:
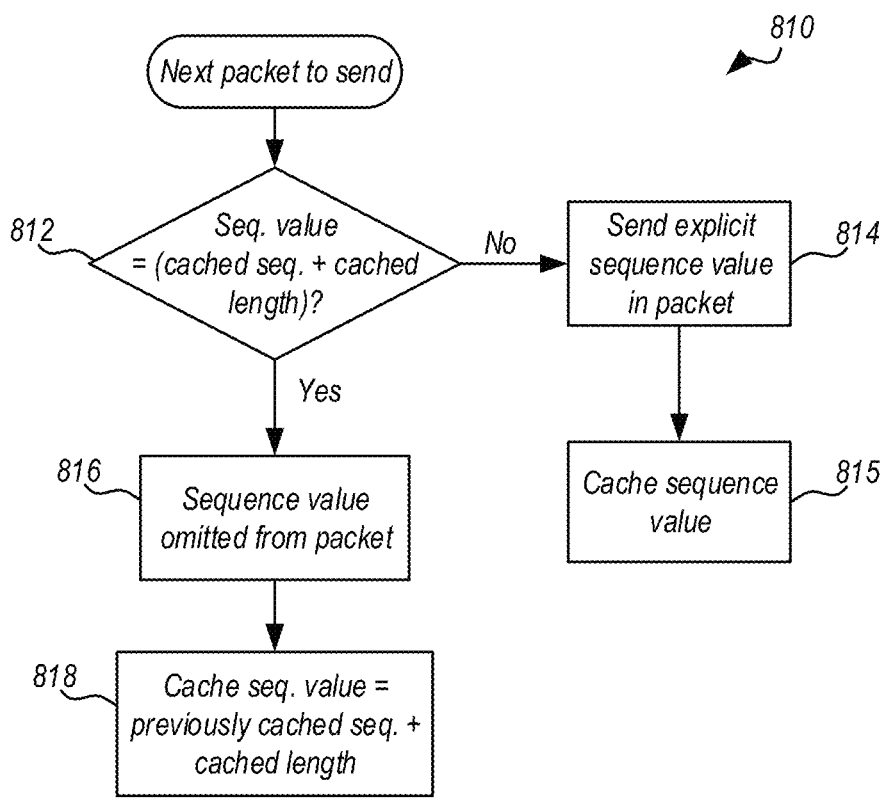
Figure 8C:
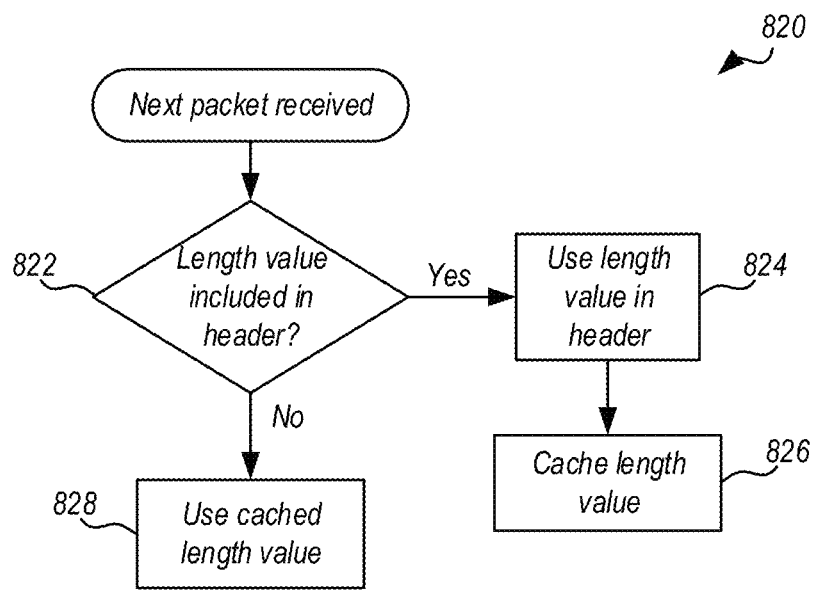
Figure 8D:
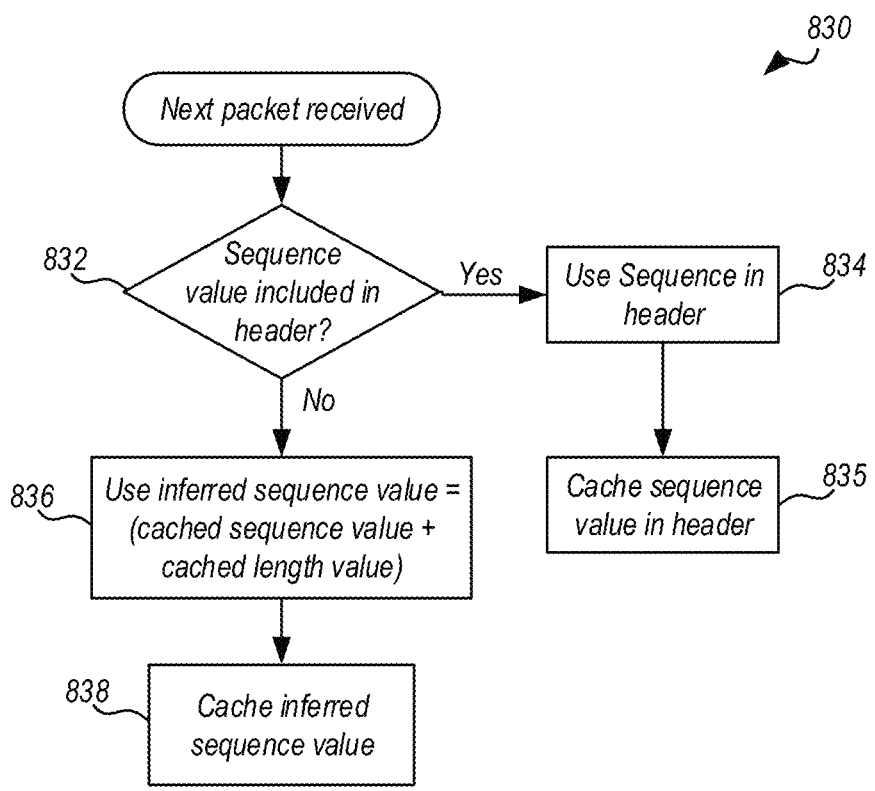

FIGS. 8A-8D are flow diagrams illustrating example processes for the packet compression technique shown in FIG. 7 and described above. The example processes shown in FIGS. 8A-8B may be performed by a sender agent, or one or more components thereof, before sending a packet to a receiver agent. FIG. 8A shows a process 800 of determining whether to include an explicit length value in the Length field of a packet, and FIG. 8B shows a process 810 of determining whether to include an explicit sequence value in the Sequence field of a packet. The processes shown in FIGS. 8C-8D may be performed by a receiver agent, or one or more components thereof, after receipt of a packet from a sender agent. FIG. 8C shows a process 820 of determining a length value for a received packet, and FIG. 8D shows a process 830 of determining a sequence value for a received packet. The processes shown may include fewer or additional operations than those shown.

In the example process 800 of FIG. 8A, a sender agent begins processing a next packet of a sequence to send to a receiver agent, and determines at 802 whether there is a change in the length value from the previous packet sent. If there is a change in the length value, then the sender agent includes the explicit length value for the packet in the Length field of the packet at 804. If there is no change in the length value from the previous packet, then the sender agent omits the explicit length value from the packet at 806. This may include omitting the Length field of the packet entirely, or including a value in the Length field indicating no change (e.g., 0).

In the example process 810 of FIG. 8B, a sender agent begins processing a next packet of a sequence to send to a receiver agent, and determines at 812 whether there is an unexpected change in the sequence value for the packet. In particular, in the example shown, the receiver agent determines whether the explicit sequence value for the packet is equal to the sum of a cached sequence value for a previously sent packet and a cached length value for the previously-sent packet. If the change in the sequence value is unexpected and might not be inferred by a receiver agent (e.g., the explicit sequence value for the packet is not equal to the sum of a cached sequence value for a previously-sent packet and a cached length value for the previously-sent packet), then the explicit sequence value is sent in the packet (e.g., in a Sequence field of the header of the packet) at 814, and the explicit value is cached at 815 (e.g., for later use in processing a next packet to send). If the change in the sequence value is expected and may be inferred by a receiver agent (e.g., the explicit sequence value for the packet is equal to the sum of a cached sequence value for a previously-sent packet and a cached length value for the previously-sent packet), then the sender agent omits the explicit sequence value from the packet at 816 and caches the sequence value for the packet (e.g., the new cached sequence value=the old cached sequence value+the cached length value) at 818 (e.g., for later use in processing the next packet to send).

In the example process 820 of FIG. 8C, a receiver agent receives a next packet of a sequence from a sender agent, and determines at 822 whether a length value was included in the packet (e.g., in a Length field of a header of the packet). If a length value was included in the packet, then the receiver agent, at 824, uses the length value included in the packet in its processing of the packet and caches the received length value at 826. If a length value was not included in the packet, then the receiver agent, at 828, uses a previously cached length value in its processing of the packet.

In the example process 830 of FIG. 8D, a receiver agent receives a next packet of a sequence from a sender agent, and determines at 832 whether a sequence value was included in the packet (e.g., in a Sequence field of a header of the packet). If a sequence value was included in the packet, then the receiver agent uses the sequence value included in the packet in its processing of the packet at 834, and caches the sequence value at 835 (e.g., for later use in processing the next packet received). If a sequence value was not included in the packet, then the receiver agent determines at 836 an inferred sequence value and uses the inferred sequence value in its processing of the packet. In the example shown, the receiver agent determines the inferred sequence value by adding a cached sequence value and a cached length value. The receiver agent then caches the inferred sequence value (e.g., for later use if another differential value is sent in a next packet).

The techniques described above may be implemented for multiple fields within a packet header. As an example, these techniques may be used for fields within a PCIe TLP Header, and may be used to compress Memory Read, Memory Write, and Completion TLP Headers. These PCIe TLP Headers contain several fields that change in predictable ways from packet to packet, and thus can benefit greatly from these compression techniques. Table 1 below lists certain TLP Header fields that may be compressed using the techniques described herein, and the associated inferred values:

TABLE 1

PCIe TLP Header Fields That Can Be Compressed

| Name | Length (Bits) | TLPs | Inferred Value |
|---|---|---|---|
| Address | 32 or 64 | MRd, MWr | Address(n−1) + Length |
| Lower Address | 7 | CplD | Lower Address(n−1) + Length |
| Byte Count | 13 | CplD | Byte Count (n−1) − Length |
| Tag | 10 | MRd | Tag(n−1) + 1 |
| Tag | 10 | CplD | Tag(n−1) + 1 (If Byte Count = 0) Tag(n−1) + 0 (If Byte Count ≠ 0) |

Figure 9:
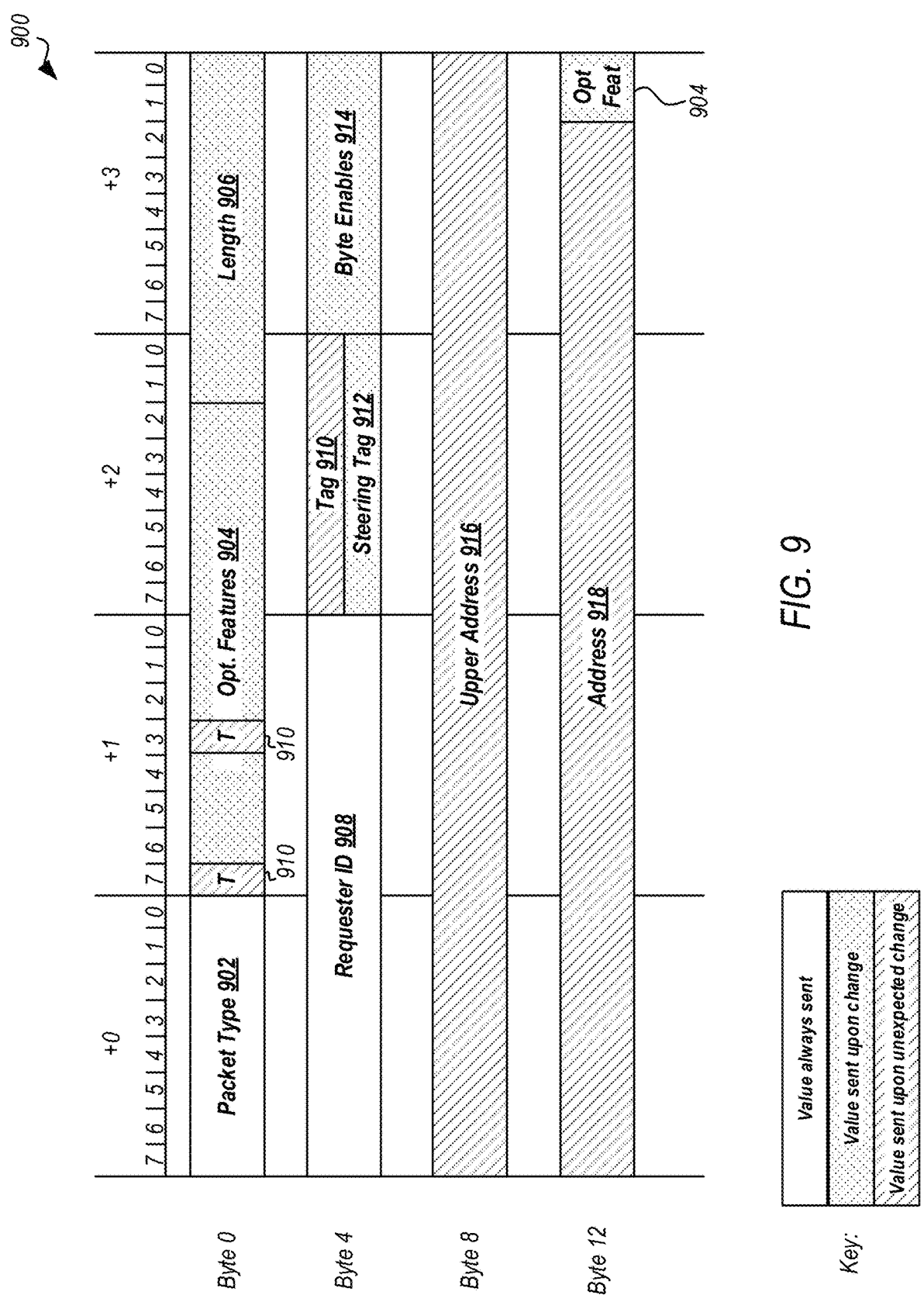
FIG. 9 is a diagram showing an example PCIe-based memory request packet header format.
Figure 10:
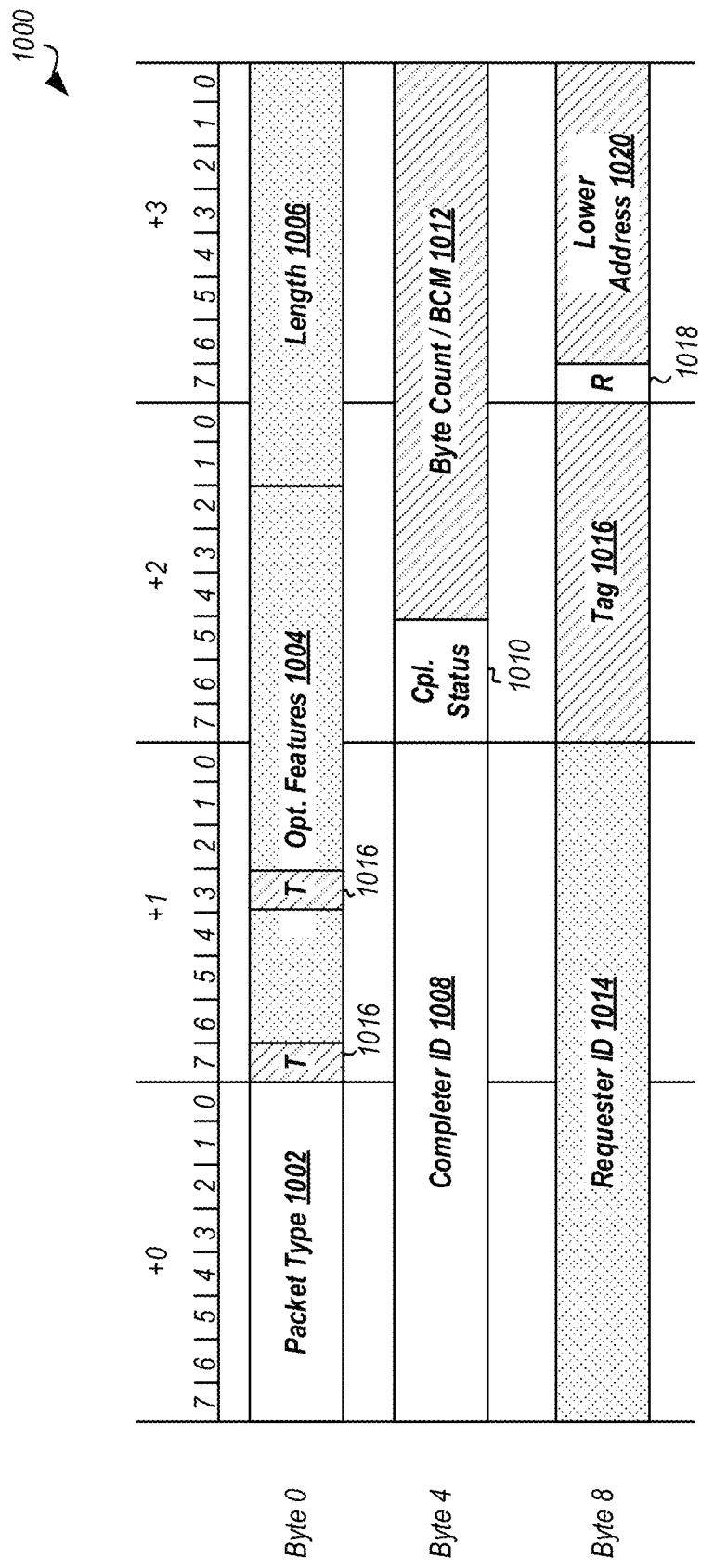
FIG. 10 is a diagram showing an example PCIe-based completion packet header format.
Figure 11:
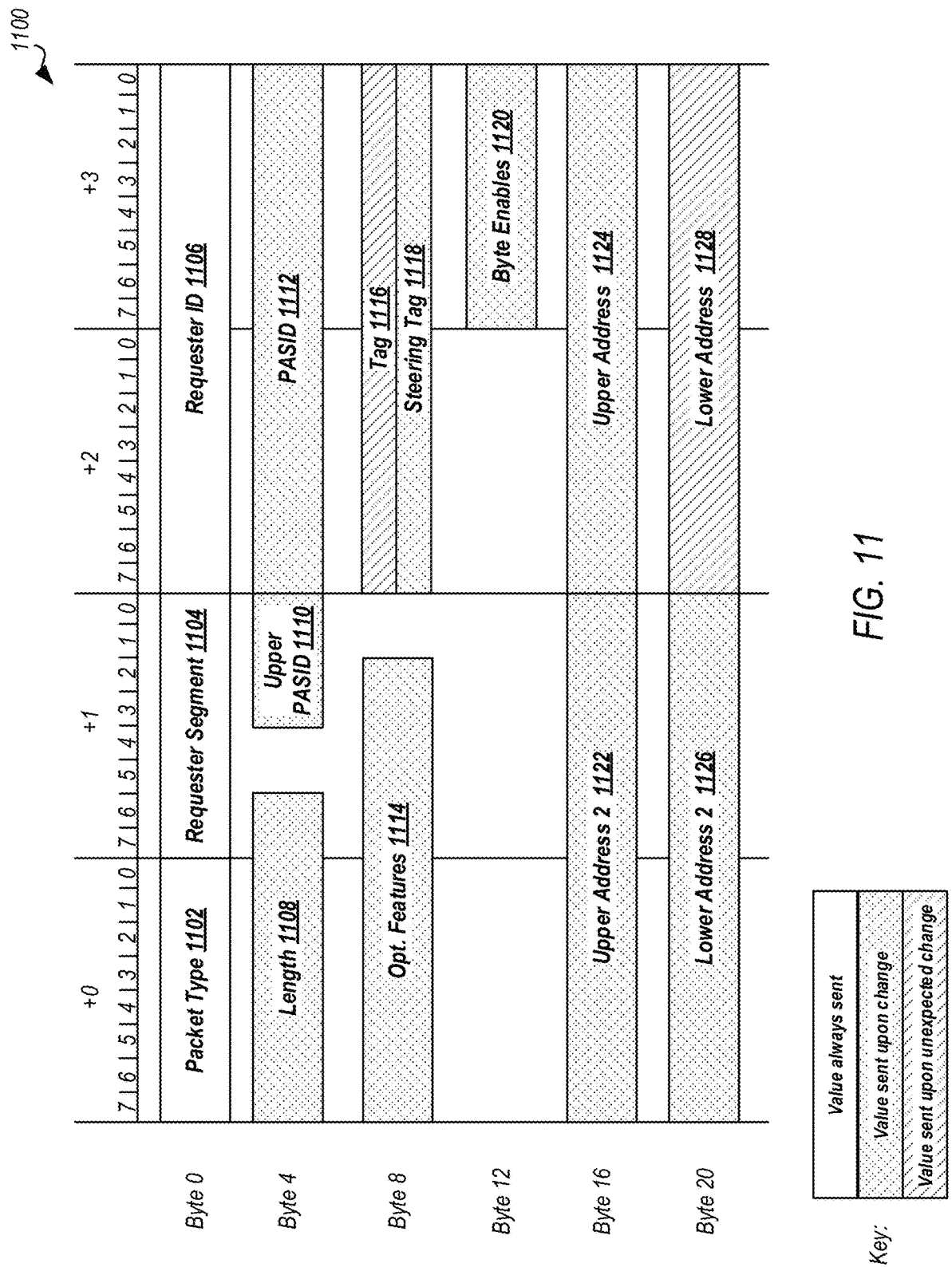
FIG. 11 is a diagram showing another example PCIe-based memory request packet header format.
Figure 12:
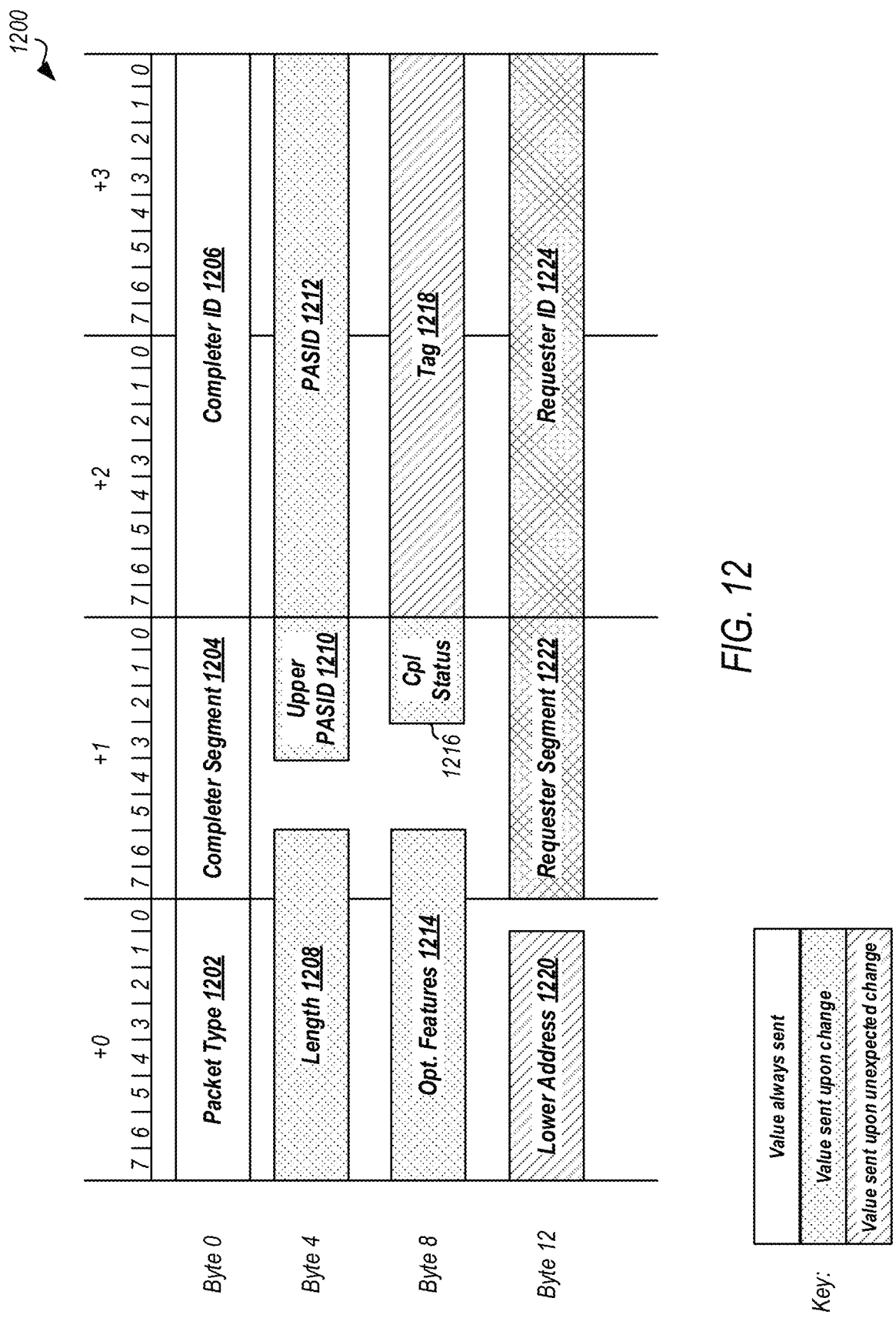
FIG. 12 is a diagram showing another example PCIe-based completion packet header format.

Turning to FIGS. 9-12, example PCIe-based packet header formats are shown. In particular, FIG. 9 is a diagram showing an example header format 900 for a PCIe-based memory request packet, FIG. 10 is a diagram showing an example header format 1000 for a PCIe-based completion packet, FIG. 11 is a diagram showing another example header format 1100 for a PCIe-based memory request packet, and FIG. 12 is a diagram showing another example header format 1200 for a PCIe-based completion packet.

In the examples shown in FIGS. 9-12, the explicit values for the fields without shading may be sent with every packet, e.g., because they are needed for PCIe routing purposes. For instance, components between the source and destination (which do not keep track of previous packets) need this information to get the packet to the correct place. The values for the fields with shading in FIGS. 9-12 may be compressed according to the present disclosure (e.g., explicit values for those fields may be omitted from transmission, or differential values may be used in lieu of the explicit values). In particular, the fields shaded with dots (e.g., the optional features field 904, length field 906, steering tag field 912, and byte enables field 914 of FIG. 9) are the fields that do not change often, while the fields shaded with diagonal lines (e.g., the tag field 910, upper address field 916, and address field 918 of FIG. 9) change from packet to packet but in a predictable manor. In some instances, the fields shaded with dots may be compressed similar to the Length fields shown in FIGS. 5, 7. That is, the explicit values for these fields may be sent only when a change is detected from a previously sent packet. In some instances, the fields shaded with diagonal lines may be compressed similar to the Sequence fields shown in FIGS. 5, 7. That is, the explicit values for these fields may be sent only when an unexpected change is detected from a previously sent packet. Thus, in some cases, differential values may be used in lieu of the explicit values for these fields, while in other cases, the fields may be omitted from the packets entirely. The fields in FIG. 12 that are cross-hatched (the Requester Segment field 1222 and Requester ID field 1224 of FIG. 12) may be needed, in some instances, by one or more intermediate components of an interconnect between the source and destination of the packet. Thus, they may be included in every packet rather than being compressed according to the techniques described herein.

The packet header formats shown in FIGS. 9-10 are example header formats for TLP packets according to example PCIe-based protocols. In particular, the header format 900 of FIG. 9 is a Memory Request TLP Header Format (using 64-bit Address Routing), and the header format 1000 of FIG. 10 is a Completion TLP Header Format.

The header format 900 of FIG. 9 includes a Packet Type header field 902, a set of Optional Features header fields 904, a Length header field 906, a Requester ID header field 908, a Tag header field 910 or Steering Tag header field 912, a Byte Enables header field 914, an Upper Address header field 916, and an Address header field 918. Because the Packet Type field 902 and Requester ID field 908 are needed for routing purposes, these header fields may not be considered for compression according to the techniques described herein. Thus, as indicated in FIG. 9, these fields will always be sent in the header. However, because the other header fields shown in FIG. 9 may change in expected ways, they may be compressed according to the techniques described herein. For instance, values for the Optional Features fields 904, Length field 906, Steering Tag field 912, and Byte Enables field 914 may be constant from packet to packet in some instances, and may change only every so often. Because of this, the values may only need to be sent when a change is detected for the value in a new packet. Thus, these fields may be compressed (e.g., omitted) in a similar manner as described above with respect to the Length fields of FIGS. 5, 7. The values of the Tag fields 910, Upper Address field 916, and Address field 918, however, may change from packet to packet, but in a predictable way (e.g., based on values of other header fields). Because of this, the values of these fields may only need to be sent when an unexpected change is detected in them for a new packet. Thus, these fields may be compressed (e.g., may be omitted or may have differential values sent in lieu of the explicit values) in a similar manner as described above with respect the Sequence fields of FIGS. 5, 7.

The header format 1000 of FIG. 10 includes a Packet Type header field 1002, an Optional Features header field 1004, a Length header field 1006, a Completer ID header field 1008, a Completion Status header field 1010, a Byte Count/BCM header field 1012, a Requester ID header field 1014, a Tag header field 1016, a Reserved header field, and a Lower Address header field. As with the Packet Type field 902 and Requester ID field 908 of the header format 900 of FIG. 9, the Packet Type field 1002 and Completer ID field 1008 of the packet 1000 are needed for routing purposes, and thus, these header fields may not be considered for compression according to the techniques described herein. Similarly, the Completion Status field 1010 is also needed in every packet (because the value might not be inferred by a receiver of the packet), and thus may not be considered for compression according to the techniques described herein. Values for the Optional Features field 1004, Length field 1006, and Requester ID field 1014 may be constant from packet to packet in some instances, and may change only every so often. Because of this, their values may only need to be sent when a change is detected for the value in a new packet. Thus, these fields may be compressed (e.g., omitted) in a similar manner as described above with respect to the Length fields of FIGS. 5, 7. The values of the Tag fields 1016, Byte Count/BCM field 1012, and Lower Address field 1020, however, may change from packet to packet, but in a predictable way (e.g., based on values of other header fields). Because of this, the values of these fields may only need to be sent when an unexpected change is detected in them for a new packet. Thus, these fields may be compressed (e.g., may be omitted or may have differential values sent in lieu of the explicit values) in a similar manner as described above with respect the Sequence fields of FIGS. 5, 7.

In some instances, the Packet Type fields 902, 1002 of FIGS. 9, 10 may include a number of bits (e.g., 3 bits) indicating a Format of the TLP and a number of bits (e.g., 5 bits) indicating a Type of the TLP. The Format bits may indicate the presence of one or more TLP Prefixes, and the Type bits may indicate an associated TLP Prefix type. The Format and Type bits of the Packet Type fields 902, 1002 may provide information required to determine the size of the remaining part of the TLP header, and information indicating whether the packet contains a data payload following the header.

In some instances, the Optional Features fields 904, 1004 of FIGS. 9, 10 may include bits indicating a Traffic Class for the packet (e.g., 3 bits), certain Attributes of the packet (e.g., 3 bits), a Lightweight Notification (LN) (e.g., 1 bit indicating that a Memory Request is a LN Read or LN Write, or that a Completion is a LN Completion), TLP Hints (TPH) (e.g., 1 bit indicating the presence of TLP Processing Hints in the TLP header and an optional TLP Processing Hints Prefix), a TLP Digest (e.g., 1 bit indicating a presence of TLP Digest in the form of a single Double Word at the end of the TLP), an Error Poisoned indication (e.g., 1 bit indicating whether the TLP is poisoned), or an Address Type indication (e.g., 2 bits).

In some instances, the Requester ID fields 908, 1014 of FIGS. 9, 10 may include a value that indicates a combination of a Requester's Bus Number, Device Number, and Function Number that uniquely identifies the Requester within a Hierarchy. In some instances, the Tag fields 910, 1016 of FIGS. 9, 10 may include a value that is a number assigned to a given Non-Posted Request to distinguish Completions for that Request from other Requests. In some instances, the Steering Tag field 912 of FIG. 9 may include a system-specific value used to identify a processing resource that a Requester explicitly targets. System software may discover and identify TPH capabilities to determine the Steering Tag allocation for each Function that supports TPH. The packet may include either a Tag field or a Steering Tag field based on the packet type. In some instances, the Upper Address field 916 and Address field 918 of FIG. 9 may indicate a memory address targeted by the Memory Request packet 900. In some instances, a byte count may be computed using the value of the Byte Enables field 914 of FIG. 9.

In some instances, the Completer ID field 1008 of FIG. 10 may include a value that indicates a combination of a Completer's Bus Number, Device Number, and Function Number that uniquely identifies the Completer of the Request within a Hierarchy. In some instances, the Completion Status field may indicate the status of a Completion. In some instances, the Byte Count/BCM field 1012 of FIG. 10 may include a bit for a Byte Count Modified (BCM)

indication with the remaining bits indicated a Byte Count for a Request. In some instances, the Lower Address Field 1020 of FIG. 10 may indicate a lower byte address for a starting byte of a Completion.

The packet header formats shown in FIGS. 11-12 are additional example header formats for TLP packets. The example header formats shown in FIGS. 11-12 include some of the same fields from those of FIGS. 9-10 (e.g., Packet Type fields 1102, 1202, Requester ID field 1106, Completer ID field 1206, Length fields 1108, 1208, Optional Features fields 1114, 1214, Tag fields 1116, 1218, Steering Tag field 1118, Byte Enables field 1120, Upper Address fields 1122, 1124, Lower Address fields 1126, 1128, 1220, and Completion Status field 1216) that are implemented similar to the corresponding fields in FIGS. 9-10, and also include additional fields from those of FIGS. 9-10. These additional fields may be included at least in part because systems with multiple PCIe segments are becoming more common, and current PCIe Specifications don't address multiple segments or how to communicate between them. In addition, while PCIe bandwidth has increased over time, latency has effectively remained the same (at least in part because retimers add additional latency). Further, devices may now have more outstanding requests to track at any given time, and more tags may be needed to track these requests. Additionally, virtualization is now commonplace. While PCIe has allowed for additional mechanisms to handle I/O virtualization, such as PASID (Process Address Space ID) and Address Translation, current mechanisms require the use of TLP Prefixes, which can be disadvantageous in some situations. For example, they require that more bits be transferred (additional overhead), and some PCIe-derived buses do not support TLP Prefixes. Placing the fields for these features into the TLP header may make virtualization more efficient and easier to implement.

Thus, in the examples shown in FIGS. 11-12, 8-bit Segment ID fields—specifically, the Requester Segment field 1104, 1222 of FIGS. 11, 12, or the Completer Segment field 1204 of FIG. 12—are included since the packets for the header formats shown in FIGS. 11-12 may be routed by the Requester ID field 1106 and Completer ID field 1206, respectively. Further, when routing in such a manner, there is a need to specify where the packet is going. In some cases, if there were no Segment ID field, the TLP may stay within a segment. Routing based on the Requester or Completer IDs may provide a shorter routing mechanism (16-24 bits of header usage) than routing by address (32 or 64 bits of header usage). Only one bit in the Packet Type fields 1102, 1202 of FIGS. 11, 12 (to indicate upstream routing) may be needed to route to the root complex. In addition, the inclusion of these fields relieves a root complex from having to track segments.

Figure 16:
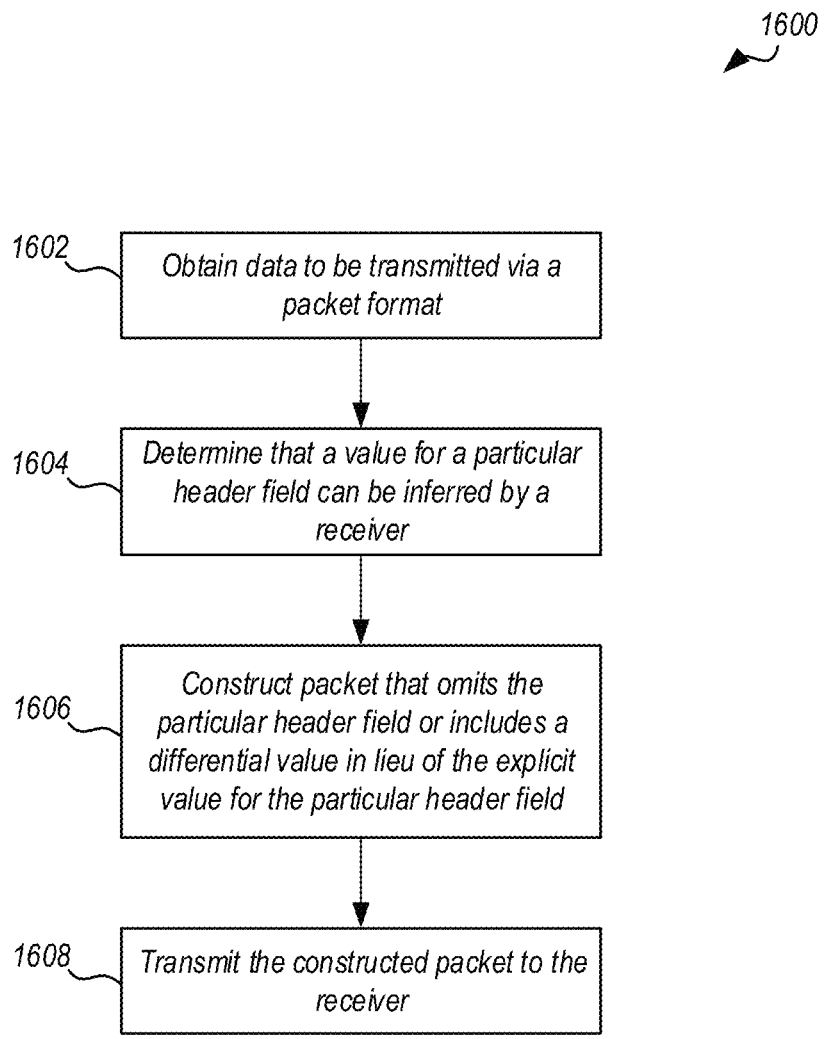
FIG. 16 is a flow diagram of an example process of compressing a packet.

Further, in the examples shown in FIGS. 11-12, 16-bit Tag fields (e.g., 1116, 1218) are used, adding 6 more bits to the known tag field (allowing for 64× additional tags). In addition, in the examples shown in FIGS. 11-12, the PASID fields (e.g., 1110, 1112, 1210, 1212) have been moved from the TLP Prefix portion into the header portion, which may simplify routing on internal fabrics. Moreover, the "Byte Count" fields have been removed in the examples shown in FIGS. 11-12, and the Length fields have expanded from 12 to 16 bits (4K to 64K MPL), allowing for expansion of the Lower Address and Configspace bits. Table 2 below indicates certain fields that may be included in different TLP types, according to some embodiments.

TABLE 2

Additional PCIe TLP Header Fields

| Packet Type | PASID | Requester Segment | 16-bit Tag | Completer Segment |
|---|---|---|---|---|
| MWr | X | X | | |
| MRd | X | X | X | |
| Cpl | X | X | X | X |

In the examples shown in FIGS. 11-12, there may be more busses per segment (16 bits versus 8 bits) along with more functions per device (10 bits versus 5 bits), which may indicate ne CfgRd and CfgWr definitions. Further, in some instances, a full 8 bit decode of the Fmt/Type field may be utilized, improving expandability of fields. In some instances, the Steering Tag field 1118 of FIG. 11 may be utilized for reads. Though particular additional fields are discussed above with respect to FIGS. 11-12, other types of additional fields may be used in PCIe TLP packets, and such fields may be compressed according to the techniques described herein.

Figure 13:
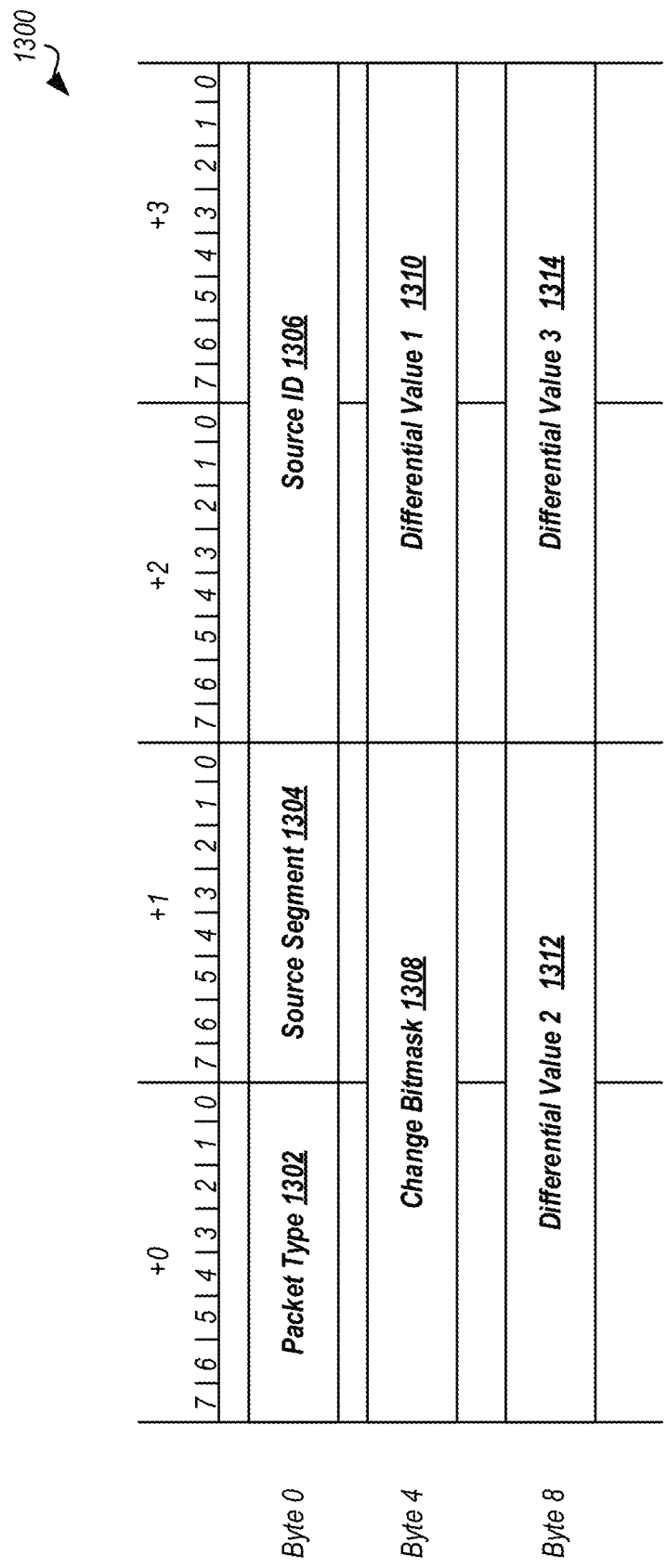
FIG. 13 is a diagram showing an example PCIe-based packet header format that has been compressed.
Figure 14:
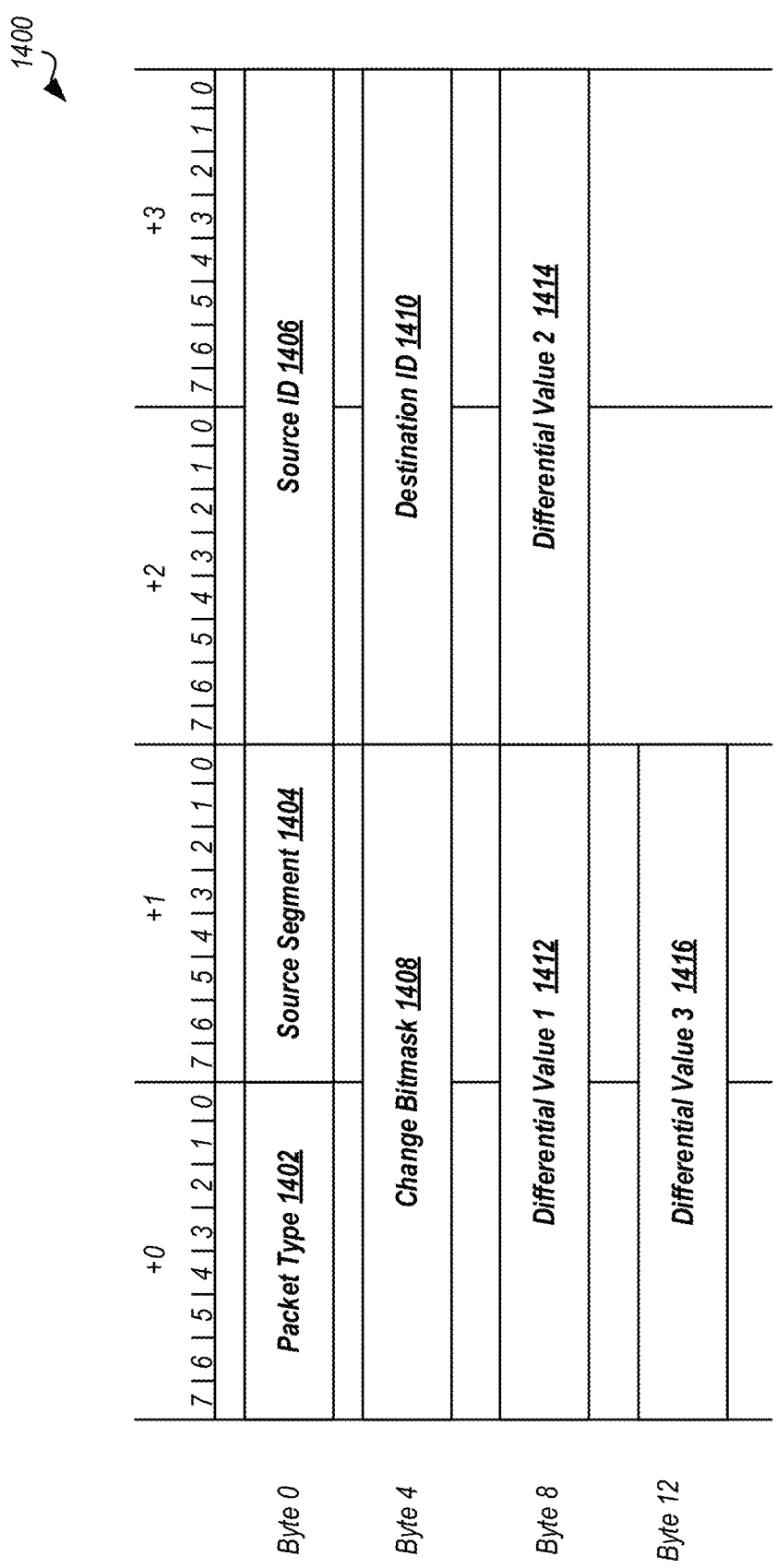
FIG. 14 is a diagram showing an example PCIe-based packet header format that has been compressed.
Figure 15:
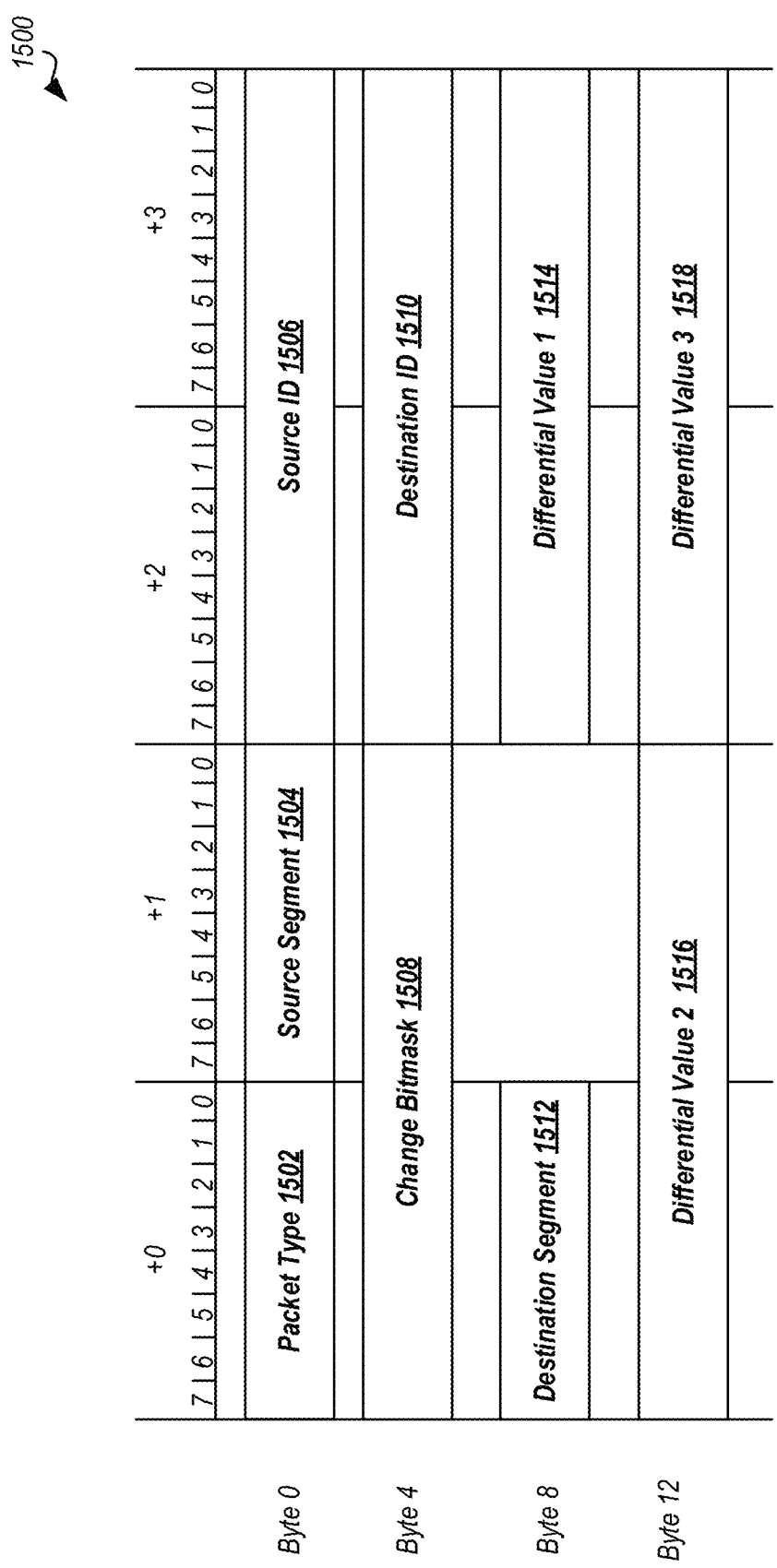
FIG. 15 is a diagram showing an example PCIe-based packet header format that has been compressed.

Turning to FIGS. 13-15, example compressed PCIe-based header formats are shown. The example header formats include differential values (e.g., 1310, 1312, 1314, 1412, 1414, 1416, 1514, 1516, 1518) in lieu of certain explicit header field values. Each example format of FIGS. 13-15 includes a Packet Type field (e.g., 1302, 1402, 1502), a Source Segment field (e.g., 1304, 1404, 1504), and a Source ID field (e.g., 1306, 1406, 1506), as these fields may be required for routing of the packets (and may thus not be compressed according to the techniques described herein). To indicate which fields have changed in the header format, a Change Bitmask field (e.g., 1308, 1408, 1508) is included in each example header format. A receiver may use the data in this field to determine which fields have changed from a previous packet. FIGS. 14-15 each include an additional Destination ID field (e.g., 1410, 1510), and FIG. 15 further includes a Destination Segment field 1512. The header formats shown in FIGS. 13-15 may include additional or fewer fields than those shown (e.g., where an explicit value is included instead of one or more of the differential values shown).

Figure 17:
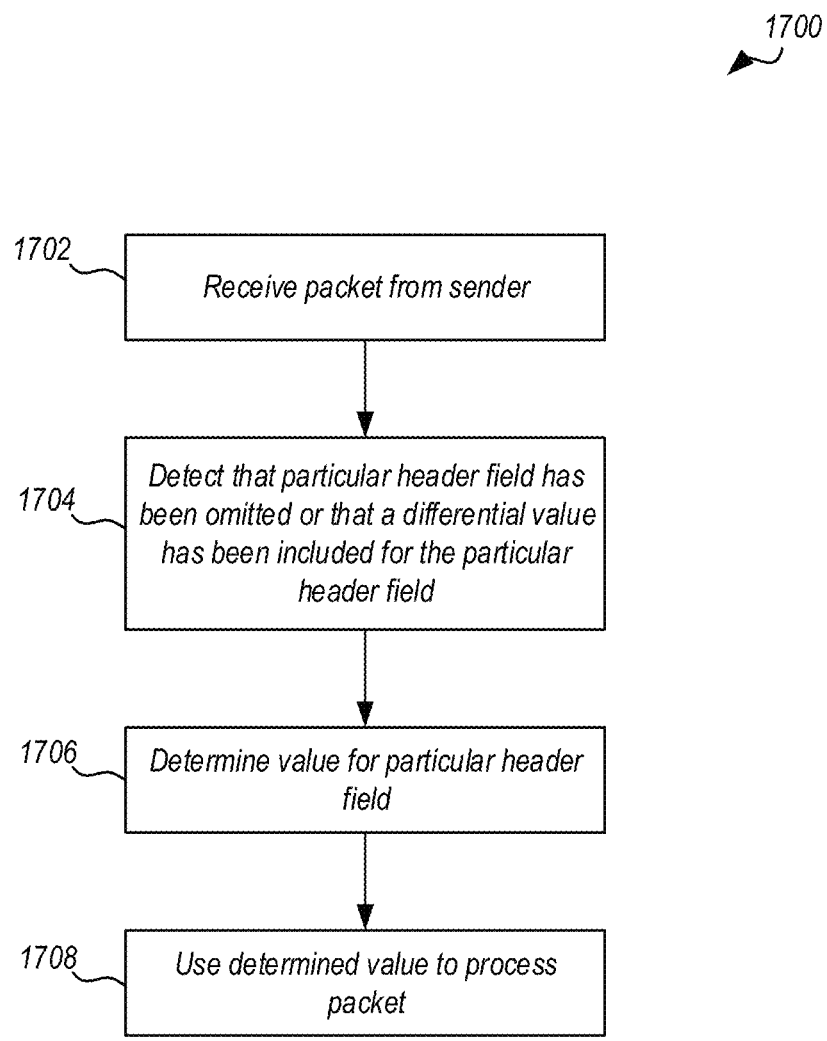
FIG. 17 is a flow diagram of an example process of decompressing a packet.

Turning to FIGS. 16-17, flow diagrams for processes of compressing and decompressing packets are shown, respectively. Operations in the example processes may be performed by components of a device that transmits or receives data packets (e.g., PCIe TLPs or other types of data packets). In some embodiments, a computer-readable medium may be encoded with instructions (e.g., a computer program) that implement one or more of the operations in the example processes. The example processes may include additional or different operations, and the operations may be performed in the order shown or in another order. In some cases, one or more of the operations shown in FIGS. 16-17 are implemented as processes that include multiple operations, sub-processes, or other types of routines. In some cases, operations can be combined, performed in another order, performed in parallel, iterated, or otherwise repeated or performed another manner.

FIG. 16 is a flow diagram of an example process 1600 of compressing a packet. The example process 1600 may accordingly be performed by a sender agent before sending a packet to a receiver agent. At 1602, the sender agent obtains data to be transmitted to the receiver agent via a packet format. At 1604, the sender agent determines that an explicit value for a particular header field can be inferred by the receiver agent, and at 1606, the sender agent constructs a packet that either omits the header field or includes a differential value for the header field in lieu of the explicit value for the particular header field. At 1608, the sender agent transmits the constructed packet to the receiver agent. In performing the process 1600, the sender agent may implement one or more operations of process 600 of FIG. 6A, process 610 of FIG. 6B, process 800 of FIG. 8A, or process 810 of FIG. 8B.

FIG. 17 is a flow diagram of an example process 1700 of decompressing a packet. The example process 1700 may accordingly be performed by a receiver agent after receipt of a packet from a sender agent. At 1702, the receiver agent receives a packet from the sender agent. At 1704, the receiver agent detects that either (1) a particular header field has been omitted, or (2) a differential value has been included for the particular header field in lieu of the explicit value for the particular header field. At 1706, the receiver agent determines the explicit value for the particular header field (e.g., using the differential value or a cached value as described above). At 1708, the receiver agent uses the value determined at 1706 to process the packet. In performing the process 1700, the receiver agent may implement one or more operations of process 620 of FIG. 6C, process 630 of FIG. 6D, process 820 of FIG. 8C, or process 830 of FIG. 8D.

The foregoing disclosure has presented a number of example techniques for compressing packets, such as packet header formats defined in an interconnect protocol. It should be appreciated that other header formats may be compressed using similar techniques. For instance, while some of the techniques discussed herein were described with reference to header formats of PCIe or PCIe-based protocols, it should be appreciated that techniques may apply to other interconnect protocols, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others, or to other types of packet-based protocols.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 18:
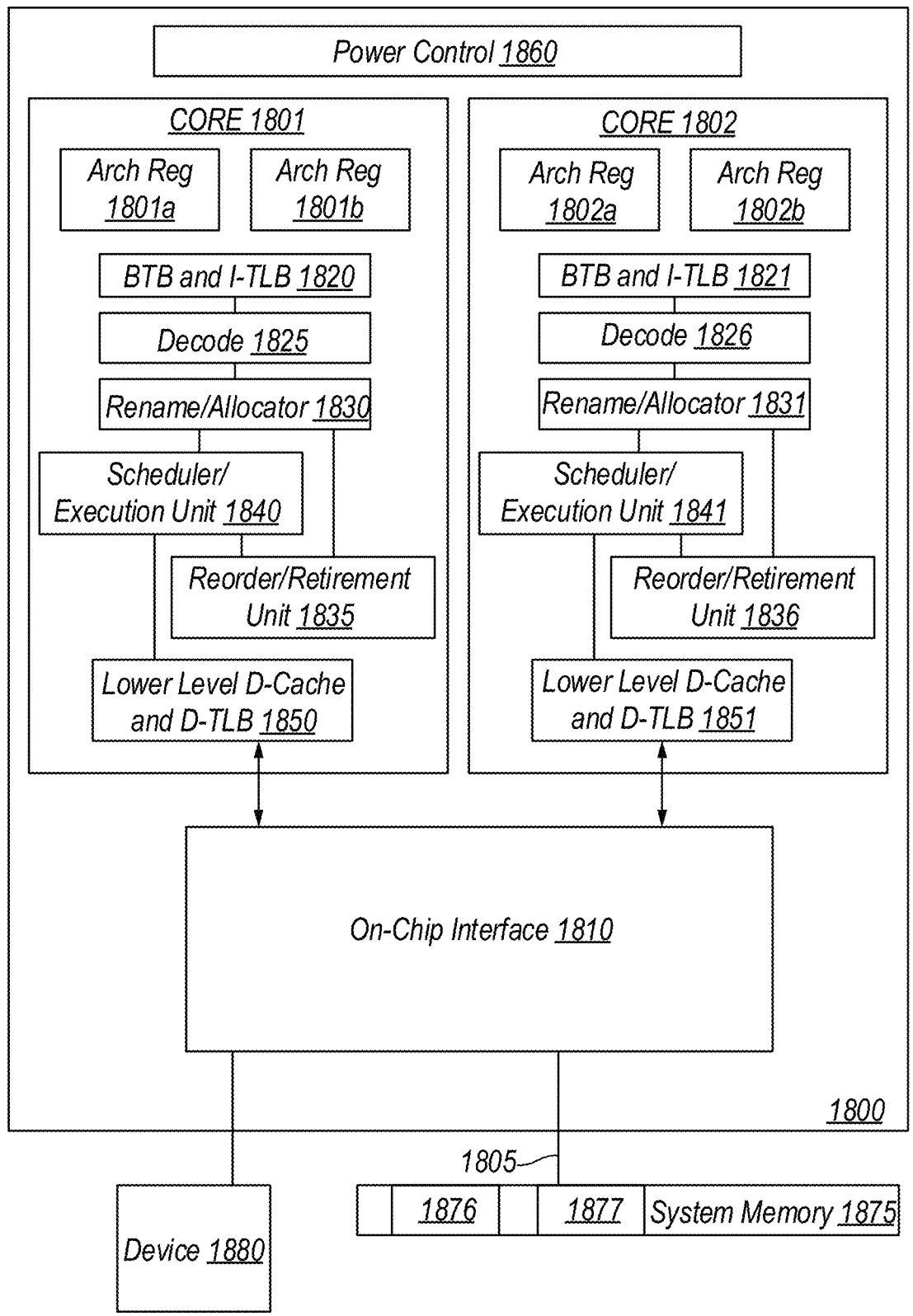
FIG. 18 illustrates an embodiment of a block diagram for a computing system including a multicore processor.

Referring to FIG. 18, an embodiment of a block diagram for a computing system including a multicore processor is depicted. Processor 1800 includes any processor or processing device, such as a microprocessor, an embedded processor, a digital signal processor (DSP), a network processor, a handheld processor, an application processor, a co-processor, a system on a chip (SOC), or other device to execute code. Processor 1800, in one embodiment, includes at least two cores—core 1801 and 1802, which may include asymmetric cores or symmetric cores (the illustrated embodiment). However, processor 1800 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1800, as illustrated in FIG. 18, includes two cores—core 1801 and 1802. Here, core 1801 and 1802 are considered symmetric cores, i.e. cores with the same configurations, functional units, and/or logic. In another embodiment, core 1801 includes an out-of-order processor core, while core 1802 includes an in-order processor core. However, cores 1801 and 1802 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1801 are described in further detail below, as the units in core 1802 operate in a similar manner in the depicted embodiment.

As depicted, core 1801 includes two hardware threads 1801*a* and 1801*b*, which may also be referred to as hardware thread slots 1801*a* and 1801*b*. Therefore, software entities, such as an operating system, in one embodiment potentially view processor 1800 as four separate processors, i.e., four logical processors or processing elements capable of executing four software threads concurrently. As alluded to above, a first thread is associated with architecture state registers 1801*a*, a second thread is associated with architecture state registers 1801*b*, a third thread may be associated with architecture state registers 1802*a*, and a fourth thread may be associated with architecture state registers 1802*b*. Here, each of the architecture state registers (1801*a*, 1801*b*, 1802*a*, and 1802*b*) may be referred to as processing elements, thread slots, or thread units, as described above. As illustrated, architecture state registers 1801*a* are replicated in architecture state registers 1801*b*, so individual architecture states/contexts are capable of being stored for logical processor 1801*a* and logical processor 1801*b*. In core 1801, other smaller resources, such as instruction pointers and renaming logic in allocator and renamer block 1830 may also be replicated for threads 1801*a* and 1801*b*. Some resources, such as re-order buffers in reorder/retirement unit 1835, ILTB 1820, load/store buffers, and queues may be shared through partitioning. Other resources, such as general purpose internal registers, page-table base register(s), low-level data-cache and data-TLB 1815, execution unit(s) 1840, and portions of out-of-order unit 1835 are potentially fully shared.

Processor 1800 often includes other resources, which may be fully shared, shared through partitioning, or dedicated by/to processing elements. In FIG. 18, an embodiment of a purely exemplary processor with illustrative logical units/resources of a processor is illustrated. Note that a processor may include, or omit, any of these functional units, as well as include any other known functional units, logic, or firmware not depicted. As illustrated, core 1801 includes a simplified, representative out-of-order (OOO) processor core. But an in-order processor may be utilized in different embodiments. The OOO core includes a branch target buffer 1820 to predict branches to be executed/taken and an instruction-translation buffer (I-TLB) 1820 to store address translation entries for instructions.

Core 1801 further includes decode module 1825 coupled to fetch unit 1820 to decode fetched elements. Fetch logic, in one embodiment, includes individual sequencers associated with thread slots 1801*a*, 1801*b*, respectively. Usually core 1801 is associated with a first ISA, which defines/specifies instructions executable on processor 1800. Often machine code instructions that are part of the first ISA include a portion of the instruction (referred to as an opcode), which references/specifies an instruction or operation to be performed. Decode logic 1825 includes circuitry that recognizes these instructions from their opcodes and passes the decoded instructions on in the pipeline for processing as defined by the first ISA. For example, as discussed in more detail below decoders 1825, in one embodiment, include logic designed or adapted to recognize specific instructions, such as transactional instruction. As a result of the recognition by decoders 1825, the architecture or core 1801 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1826, in one embodiment, recognize the same ISA (or a subset thereof). Alternatively, in a heterogeneous core environment, decoders 1826 recognize a second ISA (either a subset of the first ISA or a distinct ISA).

In one example, allocator and renamer block 1830 includes an allocator to reserve resources, such as register files to store instruction processing results. However, threads 1801*a* and 1801*b* are potentially capable of out-of-order execution, where allocator and renamer block 1830 also reserves other resources, such as reorder buffers to track instruction results. Unit 1830 may also include a register renamer to rename program/instruction reference registers to other registers internal to processor 1800. Reorder/retirement unit 1835 includes components, such as the reorder buffers mentioned above, load buffers, and store buffers, to support out-of-order execution and later in-order retirement of instructions executed out-of-order.

Scheduler and execution unit(s) block 1840, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1850 are coupled to execution unit(s) 1840. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1801 and 1802 share access to higher-level or further-out cache, such as a second level cache associated with on-chip interface 1810. Note that higher-level or further-out refers to cache levels increasing or getting further way from the execution unit(s). In one embodiment, higher-level cache is a last-level data cache—last cache in the memory hierarchy on processor 1800—such as a second or third level data cache. However, higher level cache is not so limited, as it may be associated with or include an instruction cache. A trace cache—a type of instruction cache—instead may be coupled after decoder 1825 to store recently decoded traces. Here, an instruction potentially refers to a macro-instruction (i.e. a general instruction recognized by the decoders), which may decode into a number of micro-instructions (micro-operations).

In the depicted configuration, processor 1800 also includes on-chip interface module 1810. Historically, a memory controller, which is described in more detail below, has been included in a computing system external to processor 1800. In this scenario, on-chip interface 1810 is to communicate with devices external to processor 1800, such as system memory 1875, a chipset (often including a memory controller hub to connect to memory 1875 and an I/O controller hub to connect peripheral devices), a memory controller hub, a northbridge, or other integrated circuit. And in this scenario, bus 1805 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1875 may be dedicated to processor 1800 or shared with other devices in a system. Common examples of types of memory 1875 include DRAM, SRAM, non-volatile memory (NV memory), and other known storage devices. Note that device 1880 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1800. For example in one embodiment, a memory controller hub is on the same package and/or die with processor 1800. Here, a portion of the core (an on-core portion) 1810 includes one or more controller(s) for interfacing with other devices such as memory 1875 or a graphics device 1880. The configuration including an interconnect and controllers for interfacing with such devices is often referred to as an on-core (or un-core configuration). As an example, on-chip interface 1810 includes a ring interconnect for on-chip communication and a high-speed serial point-to-point link 1805 for off-chip communication. Yet, in the SOC environment, even more devices, such as the network interface, co-processors, memory 1875, graphics processor 1880, and any other known computer devices/interface may be integrated on a single die or integrated circuit to provide small form factor with high functionality and low power consumption.

In one embodiment, processor 1800 is capable of executing a compiler, optimization, and/or translator code 1877 to compile, translate, and/or optimize application code 1876 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 19:
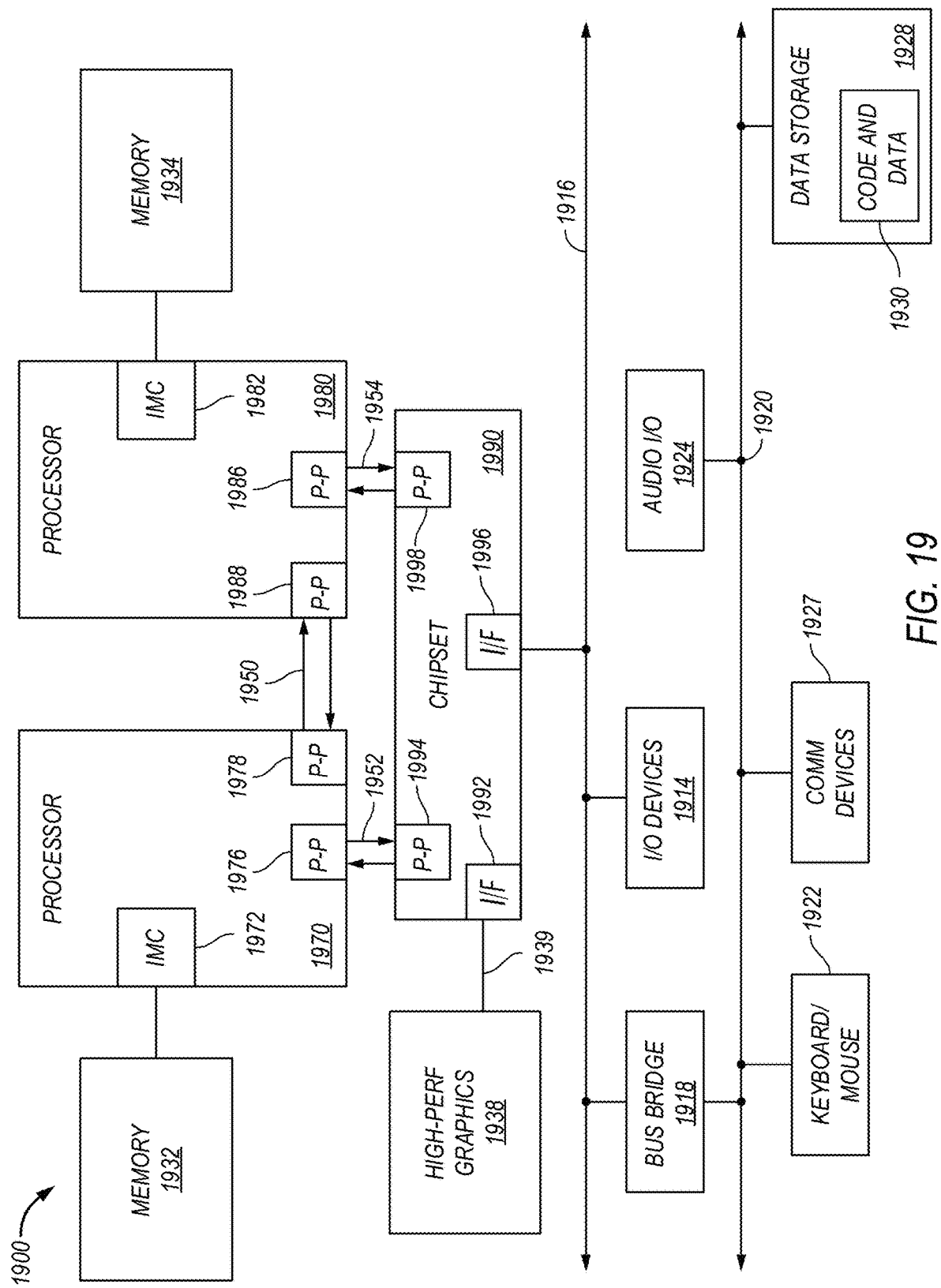
FIG. 19 illustrates an embodiment of a block for a computing system including multiple processors.

Referring now to FIG. 19, shown is a block diagram of another system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of a processor. In one embodiment, 1952 and 1954 are part of a serial, point-to-point coherent interconnect fabric, such as a high-performance architecture. As a result, the invention may be implemented within the QPI architecture.

While shown with only two processors 1970, 1980, it is to be understood that the scope of the present invention is not so limited. In other embodiments, one or more additional processors may be present in a given processor.

Processors 1970 and 1980 are shown including integrated memory controller units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 each exchange information with a chipset 1990 via individual P-P interfaces 1952, 1954 using point to point interface circuits 1976, 1994, 1986, 1998. Chipset 1990 also exchanges information with a high-performance graphics circuit 1938 via an interface circuit 1992 along a high-performance graphics interconnect 1939.

A shared cache (not shown) may be included in either processor or outside of both processors; yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 are coupled to first bus 1916, along with a bus bridge 1918 which couples first bus 1916 to a second bus 1920. In one embodiment, second bus 1920 includes a low pin count (LPC) bus. Various devices are coupled to second bus 1920 including, for example, a keyboard and/or mouse 1922, communication devices 1927 and a storage unit 1928 such as a disk drive or other mass storage device which often includes instructions/code and data 1930, in one embodiment. Further, an audio I/O 1924 is shown coupled to second bus 1920. Note that other architectures are possible, where the included components and interconnect architectures vary. For example, instead of the point-to-point architecture of FIG. 19, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Although each example described below implements compression or decompression of packets in a PCIe-based protocol, any of the following examples may be utilized to compress or decompress Universal Serial Bus (USB)-based packets, Compute Express Link (CXL) packets, Cache Coherent Interconnect for Accelerators (CCIX) packets, or Transmission Control Protocol/Internet Protocol (TCP/IP).

Example 1 is an apparatus that includes: a port comprising circuitry to implement one or more layers of a Peripheral Component Interconnect Express (PCIe)-based protocol, where the port comprises an agent to: obtain data to be transmitted to another device over a link based on the PCIe-based protocol via a packet, where the packet is to comprise a header; determine that a value for a particular header field of the packet can be inferred by the other device based on one or more header field values for a previously transmitted packet; and cause a header to be constructed for the packet, where the header is to be constructed to omit the particular header field from the packet header based on determining that the value for the particular header field may be inferred by the other device; where the port is to use the circuitry to transmit the packet with the header to the other device.

Example 2 may include the subject matter of example 1, where the particular header field is the same as a header field associated with the header field value for the previously transmitted packet.

Example 3 may include the subject matter of example 1, where the particular header field is different from a header field associated with the header field value for the previously transmitted packet.

Example 4 may include the subject matter of any one of examples 1-3, where the agent is further to: access a cached value for the particular header field; determine an inferred value for the particular header field based on the cached value; and compare the inferred value with the value of the particular header field for the packet.

Example 5 may include the subject matter of any one of examples 1-4, where the agent is further to cache the inferred value for the particular header field.

Example 6 may include the subject matter of any one of examples 1-5, where the particular header field is a tag header field, an upper address header field, an address header field, a length header field, a steering tag header field, a byte enable header field, a byte count header field, a requester identification header field, a lower address header field, or an optional features header field.

Example 7 may include the subject matter of any one of examples 1-6, where the constructed packet is a PCIe-based Transaction Layer Packet (TLP).

Example 8 may include the subject matter of example 7, where the constructed packet is a Memory Request TLP or a Completion TLP.

Example 9 is a method that includes: obtaining, at a sender agent, data to be transmitted to a receiver agent via a packet compatible with a Peripheral Component Interconnect Express (PCIe)-based protocol; determining that a value for a particular header field of the packet can be inferred by the receiver agent based on one or more header field values for a previously transmitted packet; constructing a packet header for the data, where constructing the packet header comprises omitting the particular header field from the packet header based on determining that the value for the particular header field may be inferred by the receiver agent; and transmitting the packet with the packet header to the receiver agent.

Example 10 may include the subject matter of example 9, where the particular header field is the same as a header field associated with the header field value for the previously transmitted packet.

Example 11 may include the subject matter of example 9, where the particular header field is different from a header field associated with the header field value for the previously transmitted packet.

Example 12 may include the subject matter of any one of examples 9-11, where the method further includes accessing a cached value for the particular header field; determining an inferred value for the particular header field based on the cached value; and comparing the inferred value with the value of the particular header field for the packet.

Example 13 may include the subject matter of any one of examples 9-12, where the method further includes caching, at the sender agent, the inferred value for the particular header field.

Example 14 may include the subject matter of any one of examples 9-13, where the particular header field is a tag header field, an upper address header field, an address header field, a length header field, a steering tag header field, a byte enable header field, a byte count header field, a requester identification header field, a lower address header field, or an optional features header field.

Example 15 may include the subject matter of any one of examples 9-14, where the constructed packet is a PCIe-based Transaction Layer Packet (TLP).

Example 16 may include the subject matter of example 15, where the constructed packet is a Memory Request TLP or a Completion TLP.

Example 17 is an apparatus configured to perform one or more of the methods of examples 9-16.

Example 18 is a system comprising means for performing one or more of the methods of examples 9-16.

Example 19 is a computer-readable medium comprising instructions that, when executed, cause one or more processors to perform one or more of the methods of examples 9-16.

Example 20 is an apparatus comprising a port comprising circuitry to implement one or more layers of a Peripheral Component Interconnect Express (PCIe)-based protocol, where: the circuitry is to receive a particular packet from another device over a link, where the particular packet is compatible with the PCIe-based protocol and the link is based on the PCIe-based protocol; and the agent is to: detect that a particular header field is omitted from a header of the particular packet; determine a value for the particular header field based at least in part on a cached value for the particular header field from another packet previously received on the link; and use the determined value for the particular header field of the particular packet.

Example 21 includes the subject matter of example 20, where the agent is to determine the value for the particular header field further based on a value for another header field from the previously received packet.

Example 22 includes the subject matter of example 21, where the agent is to determine the value for the particular header field by adding the cached value for the particular header field and the value for the header field from previously received packet.

Example 23 includes the subject matter of example 20, where the agent is to determine the value for the particular header field by incrementing the cached value for the particular header field by a predetermined amount.

Example 24 includes the subject matter of example 20, where the determined value for the particular header field is the same as the cached value for the particular header field.

Example 25 includes the subject matter of any one of examples 20-24, where the agent is further to cache the determined value for the particular header field.

Example 26 includes the subject matter of any one of examples 20-25, where the particular header field is a tag header field, an upper address header field, an address header field, a length header field, a steering tag header field, a byte enable header field, a byte count header field, a requester identification header field, a lower address header field, or an optional features header field.

Example 27 includes the subject matter of any one of examples 20-26, where the particular packet is a PCIe-based Transaction Layer Packet (TLP).

Example 28 includes the subject matter of example 27, where the particular packet is a Memory Request TLP or a Completion TLP.

Example 29 is a method that includes: receiving, on a link, a packet compatible with a Peripheral Component Interconnect Express (PCIe)-based protocol; detecting that a particular header field is omitted from a header of the packet; determining a value for the particular header field based at least in part on a cached value for the particular header field from a previously received packet on the link; and using the determined value for the particular header field to process the packet.

Example 30 includes the subject matter of example 29, where determining the value for the particular header field is further based on a header field value for a previously received packet.

Example 31 includes the subject matter of example 30, where determining the value for the particular header field comprises adding the cached value for the particular header field and the header field value for the previously received packet.

Example 32 includes the subject matter of example 29, where determining the value for the particular header field comprises incrementing the cached value for the particular header field by a predetermined amount.

Example 33 includes the subject matter of example 29, where the determined value for the particular header field is the same as the cached value for the particular header field.

Example 34 includes the subject matter of any one of examples 29-33, where the method further includes caching the determined value for the particular header field.

Example 35 includes the subject matter of any one of examples 29-34, where the particular header field is a tag header field, an upper address header field, an address header field, a length header field, a steering tag header field, a byte enable header field, a byte count header field, a requester identification header field, a lower address header field, or an optional features header field.

Example 36 includes the subject matter of any one of examples 29-35, where the packet is a PCIe-based Transaction Layer Packet (TLP).

Example 37 includes the subject matter of example 36, where the packet is a Memory Request TLP or a Completion TLP.

Example 38 is an apparatus configured to perform one or more of the methods of examples 29-37.

Example 39 is a system comprising means to perform one or more of the methods of examples 29-37.

Example 40 is a computer-readable medium comprising instructions that, when executed, cause one or more processors to perform one or more of the methods of examples 29-37.

Example 41 is a system that includes: a first device; and a second device coupled to the first device over a link based on a Peripheral Component Interconnect Express (PCIe)-based protocol. The first device comprises a port comprising circuitry to implement one or more layers of the PCIe-based protocol, the port comprising an agent to: obtain data to be transmitted to the second device over the link via a packet, where the packet is to comprise a header; determine that a value for a particular header field of the packet can be inferred by the second device based on one or more header field values for a previously transmitted packet; and cause a header to be constructed for the packet, where the header is to be constructed to omit the particular header field from the packet header based on determining that the value for the particular header field may be inferred by the other device; where the port is to use the circuitry to transmit the packet with the header to the second device.

Example 42 includes the subject matter of example 41, where the second device includes a port comprising circuitry to implement one or more layers of the PCIe-based protocol, where the circuitry is to receive the packet from the first device over the link and the agent is to: detect that a particular header field is omitted from the header of the packet; determine a value for the particular header field based at least in part on a cached value for the particular header field from another packet previously received on the link; and use the determined value for the particular header field of the particular packet.

Example 43 is an apparatus that includes: a port comprising circuitry to implement one or more layers of a Peripheral Component Interconnect Express (PCIe)-based protocol, where the port comprises an agent to: obtain data to be transmitted to another device over a link based on the PCIe-based protocol via a packet, where the packet is to comprise a header; determine that a value for a particular header field of the packet can be inferred by the other device based on a previous value for the particular header field in a previously transmitted packet; cause a header to be constructed for the packet, where the header comprises a differential value indicating a difference between the value for the particular header field and the previous value for the particular header field in a previously transmitted packet; where the port is to use the circuitry to transmit the packet with the header to the other device.

Example 44 includes the subject matter of example 43, where the packet further comprises a field indicating that the differential value is included in the packet in lieu of an explicit value for the particular header field.

Example 45 includes the subject matter of example 43 or 44, where the particular header field is a tag header field, an upper address header field, an address header field, a byte count header field, or a lower address header field.

Example 46 includes the subject matter of any one of examples 43-45, where the constructed packet is a PCIe-based Transaction Layer Packet (TLP).

Example 47 includes the subject matter of any one of examples 43-46, where the constructed packet is a Memory Request TLP or a Completion TLP.

Example 48 is a method that includes: obtaining, at a sender agent, data to be transmitted to a receiver agent via a packet compatible with a Peripheral Component Interconnect Express (PCIe)-based protocol; determining that a value for a particular header field of the packet can be inferred by the receiver agent based on a previous value for the particular header field in a previously transmitted packet; constructing a packet for the data, where the packet comprises a differential value indicating a difference between the value for the particular header field and the previous value for the particular header field in a previously transmitted packet; and transmitting the constructed packet to a receiver agent.

Example 49 includes the subject matter of example 48, where the packet further comprises a field indicating that the differential value is included in the packet in lieu of an explicit value for the particular header field.

Example 50 includes the subject matter of example 48 or 49, where the particular header field is a tag header field, an upper address header field, an address header field, a byte count header field, or a lower address header field.

Example 51 includes the subject matter of any one of examples 48-50, where the constructed packet is a PCIe-based Transaction Layer Packet (TLP).

Example 52 includes the subject matter of example 51, where the constructed packet is a Memory Request TLP or a Completion TLP.

Example 53 is an apparatus configured to perform one or more of the methods of examples 48-52.

Example 54 is a system comprising means to perform one or more of the methods of examples 48-52.

Example 55 is a computer-readable medium comprising instructions that, when executed, cause one or more processors to perform one or more of the methods of examples 48-52.

Example 56 is an apparatus that includes: a port comprising circuitry to implement one or more layers of a Peripheral Component Interconnect Express (PCIe)-based protocol, where: the circuitry is to receive a particular packet from another device over a link, where the particular packet is compatible with the PCIe-based protocol and the link is based on the PCIe-based protocol; and the agent is to: detect that the particular packet comprises a differential value for a particular header field; determine a value for the particular header field based on the differential value and a cached value for the particular header field; and use the determined value for the particular header field of the particular packet.

Example 57 includes the subject matter of example 56, where the agent is further to detect that the packet comprises a field indicating that the differential value was included in the packet for the particular header field instead of an actual value for the particular header field.

Example 58 includes the subject matter of example 56 or 57, where the agent is further to cache the determined value for the particular header field.

Example 59 includes the subject matter of examples 56-58, where the particular header field is a tag header field, an upper address header field, an address header field, a byte count header field, or a lower address header field.

Example 60 includes the subject matter of examples 56-59, where the constructed packet is a PCIe-based Transaction Layer Packet (TLP).

Example 61 includes the subject matter of example 60, where the constructed packet is a Memory Request TLP or a Completion TLP.

Example 62 is a method that includes: receiving a packet compatible with a Peripheral Component Interconnect Express (PCIe)-based protocol; detecting that the packet comprises a differential value for a particular header field; determining a value for the particular header field based on the differential value and a cached value for the particular header field; and using the determined value for the particular header field to process the packet.

Example 63 includes the subject matter of example 62, where detecting that the packet comprises a differential value for the particular header field is based on detecting that the packet comprises a field indicating that the differential value was included in the packet for the particular header field instead of an actual value for the particular header field.

Example 64 includes the subject matter of example 62 or 63, where the method further includes caching the determined value for the particular header field.

Example 65 includes the subject matter of any one of examples 62-64, where the particular header field is a tag header field, an upper address header field, an address header field, a byte count header field, or a lower address header field.

Example 66 includes the subject matter of any one of examples 62-65, where the constructed packet is a PCIe-based Transaction Layer Packet (TLP).

Example 67 includes the subject matter of example 66, where the constructed packet is a Memory Request TLP or a Completion TLP.

Example 68 is an apparatus configured to perform one or more of the methods of examples 62-67.

Example 69 is a system comprising means to perform one or more of the methods of examples 62-67.

Example 70 is a computer-readable medium comprising instructions that, when executed, cause one or more processors to perform one or more of the methods of examples 62-67.

Example 71 is a system that includes: a first device; and a second device communicably coupled to the first device over a link based on a Peripheral Component Interconnect Express (PCIe)-based protocol. The first device comprises a port comprising circuitry to implement one or more layers of the PCIe-based protocol, and the port comprises an agent to: obtain data to be transmitted to the second device over the link via a packet, where the packet is to comprise a header; determine that a value for a particular header field of the packet can be inferred by the second device based on a previous value for the particular header field in a previously transmitted packet; cause a header to be constructed for the packet, where the header comprises a differential value indicating a difference between the value for the particular header field and the previous value for the particular header field in a previously transmitted packet; where the port is to use the circuitry to transmit the packet with the header to the second device.

Example 72 includes the subject matter of example 71, where the second device comprises: a port comprising circuitry to implement one or more layers of the PCIe-based protocol, where the circuitry is to receive the packet from the first device over the link and the agent is to: detect that the packet includes the differential value for the particular header field; determine a value for the particular header field based on the differential value and a cached value for the particular header field; and use the determined value for the particular header field of the particular packet.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a port comprising circuitry to implement one or more layers of an interconnect protocol, wherein the port comprises an agent to:
   obtain data to be transmitted to another device over a link based on the interconnect protocol via a packet, wherein the packet is to comprise a header;
   determine that a value for a particular header field of the packet can be inferred by the other device based on one or more header field values fora previously transmitted packet, the one or more header field values including a value for the particular header field; and
   cause a header to be constructed for the packet, wherein the header is to be constructed to omit the particular header field from the packet header based on determining that the value for the particular header field may be inferred by the other device;
   wherein the port is to use the circuitry to transmit the packet with the header to the other device.

2. The apparatus of claim 1, wherein the one or more header field values for a previously transmitted packet include a value for a header field other than the particular header field.

3. The apparatus of claim 1, wherein the agent is further to:
   access a cached value for the particular header field;
   determine an inferred value for the particular header field based on the cached value; and
   compare the inferred value with the value of the particular header field for the packet.

4. The apparatus of claim 1, wherein the agent is further to cache the inferred value for the particular header field.

5. The apparatus of claim 1, wherein the particular header field is one of a tag header field, an upper address header field, an address header field, a length header field, a steering tag header field, a byte enable header field, a byte count header field, a requester identification header field, a lower address header field, or an optional features header field.

6. The apparatus of claim 1, wherein the interconnect protocol is one of a Peripheral Component Interconnect Express (PCIe)-based protocol, a Universal Serial Bus (USB)-based protocol, a Compute Express Link (CXL)-based protocol, a Cache Coherent Interconnect for Accelerators (CCIX)-based protocol, and a Transmission Control Protocol/Internet Protocol (TCP/IP)-based protocol.

7. The apparatus of claim 6, wherein the interconnect protocol is a PCIe-based protocol, and the packet is a PCIe-based Transaction Layer Packet (TLP).

8. The apparatus of claim 7, wherein the packet is a Memory Request TLP or a Completion TLP.

9. A method comprising:
obtaining, at a sender agent, data to be transmitted to a receiver agent via a packet compatible with a Peripheral Component Interconnect Express (PCIe)-based protocol;
determining that a value for a particular header field of the packet can be inferred by the receiver agent based on one or more header field values for a previously transmitted packet, the one or more header field values including a value for the particular header field;
constructing a packet header for the data, wherein constructing the packet header comprises omitting the particular header field from the packet header based on determining that the value for the particular header field may be inferred by the receiver agent; and
transmitting the packet with the packet header to the receiver agent.

10. An apparatus comprising:
a port comprising circuitry to implement one or more layers of a Peripheral Component Interconnect Express (PCIe)-based protocol, wherein:
the circuitry is to receive a particular packet from another device over a link, wherein the particular packet is compatible with the PCIe-based protocol and the link is based on the PCIe-based protocol; and
the agent is to:
   detect that a particular header field is omitted from a header of the particular packet;
   determine a value for the particular header field based at least in part on a cached value for the particular header field from another packet previously received on the link; and
   use the determined value for the particular header field of the particular packet.

11. The apparatus of claim 10, wherein the agent is to determine the value for the particular header field further based on a value for another header field from the previously received packet.

12. The apparatus of claim 11, wherein the agent is to determine the value for the particular header field by adding the cached value for the particular header field and the value for the other header field from the previously received packet.

13. The apparatus of claim 10, wherein the agent is to determine the value for the particular header field by incrementing the cached value for the particular header field by a predetermined amount.

14. The apparatus of claim 10, wherein the determined value for the particular header field is the same as the cached value for the particular header field.

15. The apparatus of claim 10, wherein the agent is further to cache the determined value for the particular header field.

16. The apparatus of claim 10, wherein the particular header field is a tag header field, an upper address header field, an address header field, a length header field, a steering tag header field, a byte enable header field, a byte count header field, a requester identification header field, a lower address header field, or an optional features header field.

17. The apparatus of claim 10, wherein the particular packet is a PCIe-based Transaction Layer Packet (TLP).

18. A system comprising:
a first device; and
a second device coupled to the first device over a link based on a Peripheral Component Interconnect Express (PCIe)-based protocol;
wherein the first device comprises a port comprising circuitry to implement one or more layers of the PCIe-based protocol, the port comprising an agent to:

obtain data to be transmitted to the second device over the link via a packet, wherein the packet is to comprise a header;

determine that a value for a particular header field of the packet can be inferred by the second device based on one or more header field values for a previously transmitted packet, the one or more header field values including a value for the particular header field; and cause a header to be constructed for the packet, wherein the header is to be constructed to omit the particular header field from the packet header based on determining that the value for the particular header field may be inferred by the other device;

wherein the port is to use the circuitry to transmit the packet with the header to the second device.

19. The system of claim 18, wherein the second device comprises:

a port comprising circuitry to implement one or more layers of the PCIe-based protocol, wherein the circuitry is to receive the packet from the first device over the link and the agent is to:

detect that a particular header field is omitted from the header of the packet;

determine a value for the particular header field based at least in part on a cached value for the particular header field from another packet previously received on the link; and use the determined value for the particular header field of the particular packet.

\* \* \* \* \*